(12) United States Patent
Ishikuri

(10) Patent No.: US 11,070,436 B2
(45) Date of Patent: Jul. 20, 2021

(54) COMMUNICATION CONTROL APPARATUS, COMMUNICATION APPARATUS, CONTROL METHODS THEREOF, AND SYSTEM

(71) Applicant: CANON KABUSHIKI KAISHA, Tokyo (JP)

(72) Inventor: Ryuichi Ishikuri, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/448,165

(22) Filed: Jun. 21, 2019

(65) Prior Publication Data

US 2020/0007401 A1 Jan. 2, 2020

(30) Foreign Application Priority Data

Jun. 29, 2018 (JP) .............................. JP2018-125287

(51) Int. Cl.
| | | |
|---|---|---|
| *H04L 12/24* | (2006.01) | |
| *H04L 12/703* | (2013.01) | |
| *H04L 12/759* | (2013.01) | |
| *H04L 12/18* | (2006.01) | |
| *H04L 12/753* | (2013.01) | |
| *H04L 12/803* | (2013.01) | |

(Continued)

(52) U.S. Cl.
CPC .......... *H04L 41/12* (2013.01); *H04L 12/1877* (2013.01); *H04L 41/0893* (2013.01); *H04L 45/028* (2013.01); *H04L 45/28* (2013.01); *H04L 45/46* (2013.01); *H04L 45/48* (2013.01); *H04L 47/125* (2013.01); *H04L 47/38* (2013.01); *H04L 65/1069* (2013.01); *H04L 65/4084* (2013.01); *H04L 65/80* (2013.01)

(58) Field of Classification Search
CPC . H04L 12/1877; H04L 41/0893; H04L 41/12; H04L 45/028; H04L 45/28; H04L 45/46; H04L 45/48; H04L 47/125; H04L 47/38; H04L 65/1069; H04L 65/4084; H04L 65/80
See application file for complete search history.

(56) References Cited

U.S. PATENT DOCUMENTS

| | | | |
|---|---|---|---|
| 7,855,979 B2 | 12/2010 | Yanagihara | |
| 2005/0286546 A1 * | 12/2005 | Bassoli ................ | G11B 27/105 370/432 |

(Continued)

FOREIGN PATENT DOCUMENTS

JP      2008-092004 A     4/2008

*Primary Examiner* — Thomas J Dailey
(74) *Attorney, Agent, or Firm* — Venable LLP

(57) ABSTRACT

A system includes a plurality of communication apparatuses grouped into groups, a delivery apparatus that delivers content to the communication apparatuses that belong to the groups, and a communication control apparatus that performs grouping. The communication control apparatus acquires transmittability of the delivery apparatus, acquires transmittability of the communication apparatuses, and acquires bit rates of the content, and the grouping unit determines total transmittability of the communication apparatuses of each of the groups and a total of the bit rates, and performs grouping such that either higher one of the total transmittability and the total bit rate does not exceed transmittability of the communication apparatuses of a group in a higher hierarchical level.

8 Claims, 16 Drawing Sheets

(51) Int. Cl.
*H04L 12/811* (2013.01)
*H04L 12/715* (2013.01)
*H04L 29/06* (2006.01)

(56) References Cited

U.S. PATENT DOCUMENTS

| | | | |
|---|---|---|---|
| 2006/0270395 A1* | 11/2006 | Dhawan | H04L 65/4076 455/418 |
| 2007/0192454 A1* | 8/2007 | Blea | H04L 67/14 709/223 |
| 2010/0042668 A1* | 2/2010 | Liang | H04L 67/1048 709/201 |
| 2012/0102517 A1* | 4/2012 | Yang | H04L 65/4076 725/17 |
| 2013/0110981 A1* | 5/2013 | Thornburgh | H04L 67/1046 709/219 |
| 2016/0150011 A1* | 5/2016 | Le Nerriec | H04N 21/4307 709/205 |

* cited by examiner

FIG. 6

| GROUP NUMBER 601 | ADDRESS INFORMATION 602 | TRANSMITTABILITY INFORMATION 603 | REQUIRED BIT RATE 604 | ... |
|---|---|---|---|---|
| 1 | AAA.AAA.A.A | F Mbps | K Mbps | ... |
| 1 | BBB.BBB.B.B | G Mbps | L Mbps | ... |
| 2 | CCC.CCC.C.C | H Mbps | M Mbps | ... |
| 2 | DDD.DDD.D.D | I Mbps | N Mbps | ... |
| 3 | EEE.EEE.E.E | J Mbps | O Mbps | ... |
| ... | ... | ... | ... | |

GROUP LIST

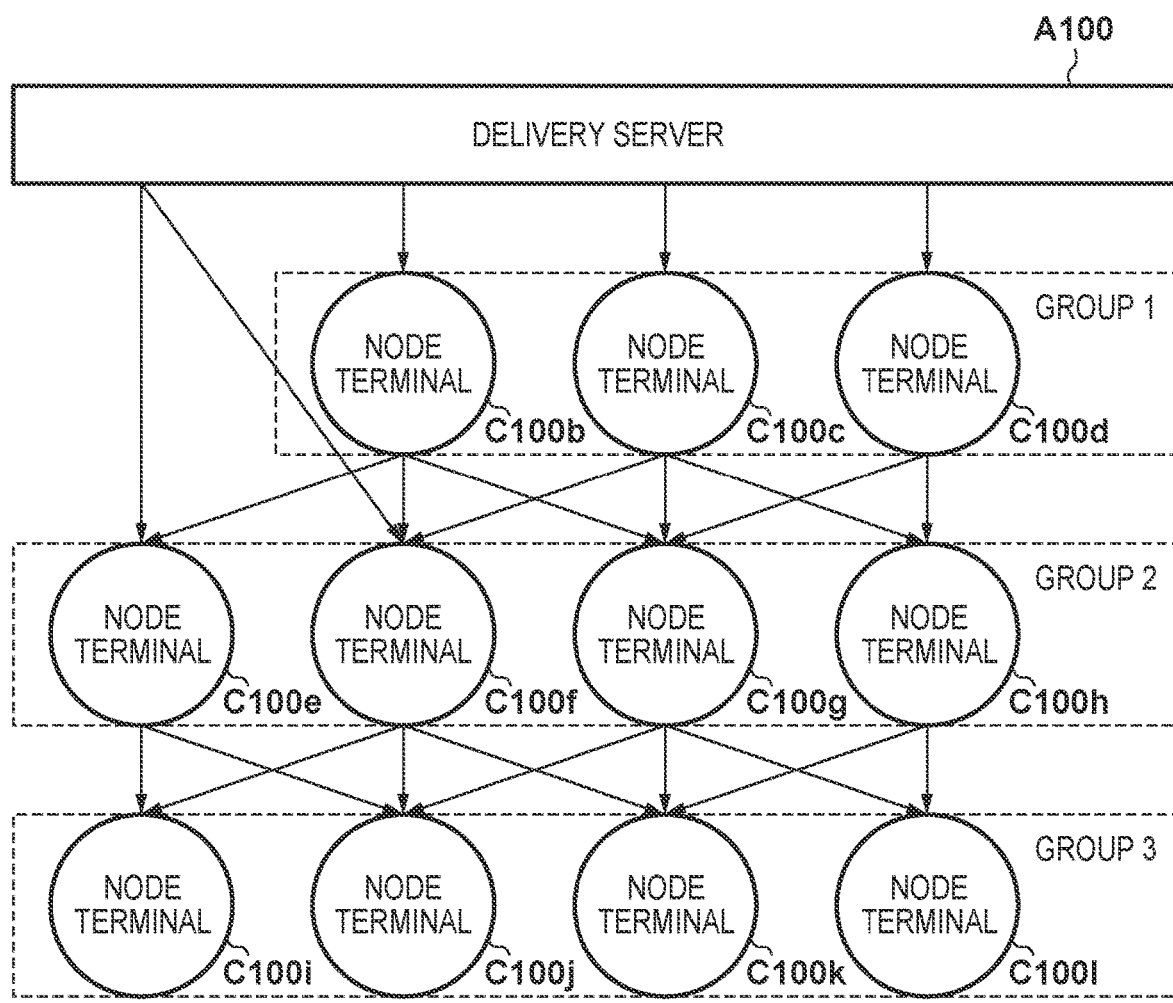
F I G. 10

COMMUNICATION CONTROL APPARATUS, COMMUNICATION APPARATUS, CONTROL METHODS THEREOF, AND SYSTEM

BACKGROUND OF THE INVENTION

Field of the Invention

The present invention relates to a communication control technique for a combined delivery system of a client-server network and a P2P network.

Description of the Related Art

In a content delivery system in which ALM (Application Layer Multicast) technology is used, there is a potential risk that the delivery topology (content delivery path) will be disturbed due to disassociation of a node terminal (viewer). Particularly, in a broadcast delivery system in which simultaneous content delivery is important, in a state where discontinuity of a delivery path has occurred due to disassociation of a node terminal, if the delivery path is not re-constructed in a short time, a stream is not supplied to the node terminals in a lower hierarchical level of the delivery path that are connected to the disassociated node terminal, which results in a situation where content reproduction stops in the node terminals in the lower hierarchical level connected to the disassociated node terminal.

In order to avoid such a situation, the node terminals in the lower hierarchical level to which the content delivery path is discontinued need to directly access the delivery server to acquire content until the delivery topology is re-constructed. However, heavy access from the node terminals to the delivery server leads to an increased load on the delivery server, and the server may go down if the load exceeds the processing power of the server. To address such a situation, Japanese Patent Laid-Open No. 2008-92004 discloses a method in which the number of node terminals that can disassociate from a delivery topology is limited so as to prevent the occurrence of large-scale discontinuity of the delivery path.

However, the method disclosed in Japanese Patent Laid-Open No. 2008-92004 causes a node terminal that desires to disassociate from the delivery topology to wait for disassociation, and thus the viewers cannot terminate the content reproduction function of the node terminals.

SUMMARY OF THE INVENTION

The present invention has been made in consideration of the aforementioned problems, and realizes techniques in which the load on the delivery server is reduced until the delivery topology is re-constructed, without causing a node terminal that desires to disassociate from the delivery topology to wait for disassociation.

In order to solve the aforementioned problems, the present invention provides a system which includes a plurality of communication apparatuses grouped into groups, a delivery apparatus that delivers content to the communication apparatuses that belong to the groups, and a communication control apparatus that performs grouping, wherein the communication control apparatus includes: a grouping unit configured to group the plurality of communication apparatuses, a determining unit configured to determine a content reproduction start time to start reproducing the content for each of the groups; a notification unit configured to notify the communication apparatuses in each of the groups of the content reproduction start time; and a control unit configured to perform control such that the content is delivered in order from a group having an earlier content reproduction start time to a group having a later content reproduction start time, wherein each of the communication apparatuses includes: a receiving unit configured to receive the content; a storage unit configured to store the received content; and a control unit configured to reproduce the content stored in the storage unit according to the reproduction start time notified from the communication control apparatus.

In order to solve the aforementioned problems, the present invention provides a communication control apparatus comprising: a communication unit configured to communicate with a plurality of communication apparatuses and a content delivery apparatus; a grouping unit configured to group the plurality of communication apparatuses into groups; a determining unit configured to determine a content reproduction start time to start reproducing content for each of the groups; a notification unit configured to notify the communication apparatuses in each of the groups of the content reproduction start time; and a control unit configured to perform control such that the content is delivered in order from a group having an earlier content reproduction start time to a group having a later content reproduction start time.

In order to solve the aforementioned problems, the present invention provides a communication apparatus which is grouped by a communication control apparatus, and communicates with a communication apparatus that belongs to another group, the communication apparatus comprising: a receiving unit configured to receive content from the communication apparatus that belongs to the other group; a storage unit configured store the received content; and a control unit configured to reproduce the content stored in the storage unit according to a reproduction start time notified from the communication control apparatus.

In order to solve the aforementioned problems, the present invention provides a method of controlling a communication control apparatus having a communication unit and a grouping unit configured to group a plurality of communication apparatuses into groups, the method comprising: determining a content reproduction start time to start reproducing content for each of the groups; notifying the communication apparatuses in each of the groups of the content reproduction start time; and performing control such that the content is delivered in order from a group having an earlier content reproduction start time to a group having a later content reproduction start time.

In order to solve the aforementioned problems, the present invention provides a method of controlling a communication apparatus which is grouped by a communication control apparatus, and communicates with a communication apparatus that belongs to another group, the method comprising: receiving content from the communication apparatus that belongs to the other group; storing the received content in a storage unit; and reproducing the content stored in the storage unit according to a reproduction start time notified from the communication control apparatus.

In order to solve the aforementioned problems, the present invention provides a non-transitory computer-readable storage medium storing a program for causing a computer to function as a communication control apparatus comprising: a communication unit configured to communicate with a plurality of communication apparatuses and a content delivery apparatus; a grouping unit configured to group the plurality of communication apparatuses into groups; a determining unit configured to determine a content reproduction start time to start reproducing content for each of the groups; a notification unit configured to notify the communication apparatuses in each of the groups of the content reproduction start time; and a control unit configured to perform control such that the content is delivered in order from a group having an earlier content reproduction start time to a group having a later content reproduction start time.

In order to solve the aforementioned problems, the present invention provides a non-transitory computer-readable storage medium storing a program for causing a computer to function as a communication apparatus which is grouped by a communication control apparatus, and communicates with a communication apparatus that belongs to another group, the communication apparatus comprising: a receiving unit configured to receive content from the communication apparatus that belongs to the other group; a storage unit configured store the received content; and a control unit configured to reproduce the content stored in the storage unit according to a reproduction start time notified from the communication control apparatus.

According to the present invention, the load on the delivery server can be reduced until the delivery topology is re-constructed, without causing a node terminal that desires to disassociate from the delivery topology to wait for disassociation.

Further features of the present invention will become apparent from the following description of exemplary embodiments (with reference to the attached drawings).

BRIEF DESCRIPTION OF THE DRAWINGS

FIG. 6 is a diagram showing an example of a group list according to the present embodiment.

FIG. 10 is a configuration diagram showing a delivery topology re-constructed after disassociation of a node terminal according to the present embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

System Configuration

Figure 1:
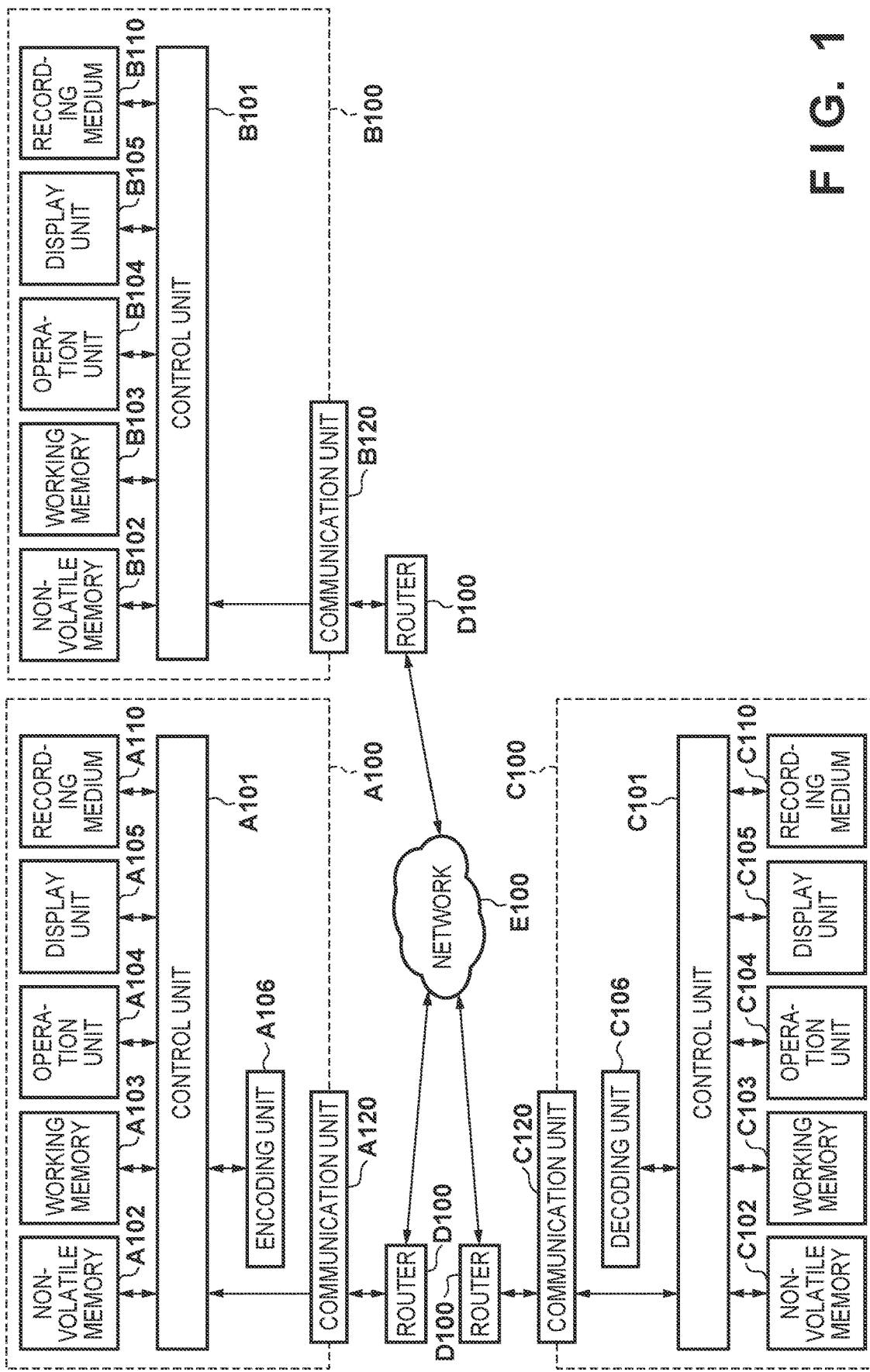
FIG. 1 is a diagram showing a system configuration and an apparatus configuration of a system according to an embodiment of the present invention.

A system configuration according to the present embodiment will be described first with reference to FIG. 1.

In the present embodiment, a description will be given of a combined system of a client-server network and a P2P (peer-to-peer) network, the client-server network being configured to deliver video content including that of sports, concerts, and the like from a delivery server A100 (delivery apparatus) to a node terminal (user terminal) C100 (communication apparatus), and the P2P (peer-to-peer) network being configured such that a plurality of node terminals C100 grouped into groups communicate between groups so as to transmit and receive content.

The system according to the present embodiment includes: a plurality of node terminals C100 that constitute the P2P network and are grouped into a plurality of groups; a delivery server A100 that delivers content to any of the node terminals C100 that belong to the groups; and a connection control server B100 that performs control to reproduce content for each group.

The node terminals C100 are communication apparatuses that perform communication between the delivery server A100 and the connection control server B100 via the client-server network, and perform communication between node terminals C100 via the P2P network. The node terminals C100 may be, for example, smartphones, which are a type of mobile phone, personal computers (PC) such as notebook computers, tablet computers or wearable computers, media players, or the like.

The delivery server A100 is a delivery apparatus, such as a server computer, that communicates with the connection control server B100 via the client-server network, and delivers content data to the node terminals C100 of each group of the P2P network.

The connection control server B100 is a communication control apparatus, such as a server computer, that communicates with the delivery server A100 and the node terminal C100 via the client-server network, groups the node terminals C100 that constitute the P2P network, constructs a delivery topology (add and disassociate a node terminal C100 to the delivery topology), and the like.

In the present embodiment, the connection control server B100 performs control so as to shift the content reproduction start time for each group of the P2P network (delay the content reproduction start time for a group in a lower hierarchical level with respect to that for a group in a higher hierarchical level), and deliver content to the node terminals C100 sequentially in order from those of the group having an earlier content reproduction start time to those of the group having a later content reproduction start time. With this control, the load on the delivery server is reduced during a period from when a node terminal C100 performs disassociation from the network to when the delivery topology is re-constructed.

Apparatus Configuration

Next, the configuration and function of the delivery server A100, the connection control server B100, and the node terminal C100 that constitute the system according to the present embodiment will be described with reference to FIG. 1.

First, a description of the delivery server A100 will be given.

The delivery server A100 includes a control unit A101, a non-volatile memory A102, a working memory A103, an operation unit A104, a display unit A105, an encoding unit A106, a recording medium A110, and a communication unit A120.

The control unit A101 is a central processing apparatus (CPU) that performs overall control on the delivery server A100. The control unit A101 implements communication processing and control processing, which will be described later, by executing a program stored in the non-volatile memory A102, which will be described later. Instead of the control unit A101 controlling the entire apparatus, a plurality of hardware components may perform overall control of the apparatus by sharing processing. The same applies to the hardware in the server, which will be described below, and a plurality of hardware components may share processing.

The non-volatile memory A102 is an electrically erasable and recordable memory. For example, an EEPROM is used. In the non-volatile memory A102, constants for operating the control unit A101, programs, and the like are recorded. As used herein, the term "program" refers to a program for executing a sequence, which will be described later, in the present embodiment. A program executed by the control unit A101, which will be described later, and the like are stored.

The working memory A103 is used as a work area in which the constants, variables, a program read out from the non-volatile memory A102, and the like for operating the control unit A101 are loaded. The working memory A103 is also used as a buffer memory for temporarily storing data received from the connection control server B100 and the node terminal C100 and content data to be delivered to the node terminal C100, and a memory for displaying images on the display unit A105. The working memory A103 is also used as a storage area for storing parameters associated with network connection processing carried out by the communication unit A120, and the like.

The operation unit A104 includes operation members for accepting various types of operations from the user such as various types of switches, buttons, a keyboard, and a mouse. A touch panel that is provided unitarily with the display panel of the display unit A105 is also included in the operation unit A104.

The display unit A105 displays content, and also displays a GUI (Graphical User Interface) including characters, graphics, and signs for performing interactive operations. The display unit A105 may be a display device such as, for example, a liquid crystal display, or an organic EL display. The display unit A105 may be configured unitarily with the delivery server A100, or may be an external apparatus that is connected to the delivery server A100. The delivery server A100 can be connected to the display unit A105, and may have a function of controlling display of the display unit A105.

The encoding unit A106 encodes the content data recorded in the recording medium A110, which will be described later, in accordance with a predetermined encoding method.

The recording medium A110 can record the encoded content data that is to be delivered to the node terminals C100. As the recording medium A110, for example, a HDD (Hard Disk Drive) or a SSD (Solid State Drive) may be used. The recording medium A110 may be removably attachable to the delivery server A100, or may be incorporated in the delivery server A100. The delivery server A100 may include at least an access unit configured to access the recording medium A110. The content data recorded in the recording medium A110 is not necessarily encoded.

The communication unit A120 is an interface for connecting to the connection control server B100 or the node terminal C100. The delivery server A100 according to the present embodiment can perform data exchange with the connection control server B100 and the node terminal C100 via the communication unit A120. In the present embodiment, the communication unit A120 communicates with the connection control server B100 and the node terminal C100 via a network E100 such as the Internet connected through a router D100. As the communication method, various communication methods can be used such as the Ethernet® and a wireless LAN.

Next, the connection control server B100 will be described.

The connection control server B100 includes a control unit B101, a non-volatile memory B102, a working memory B103, an operation unit B104, a display unit B105, a recording medium B110, and a communication unit B120. The basic functions of the above-described blocks are the same as those of the delivery server A100. Accordingly, a description of the basic functions of the blocks will be omitted, and the following description will be given focusing on differences.

The working memory B103 is used as a buffer memory for temporarily storing data received from the delivery server A100 and the node terminal C100, a group list, which will be described later, and the like. The recording medium B110 records the data received from the delivery server A100 and the node terminal C100, a group list, which will be described later, and the like.

Next, the node terminal C100 will be described.

The node terminal C100 includes a control unit C101, a non-volatile memory C102, a working memory C103, an operation unit C104, a display unit C105, a recording medium C110, a decoding unit C106, and a communication unit C120. The basic functions of the above-described blocks are the same as those of the delivery server A100. Accordingly, a description of the basic functions of the blocks will be omitted, and the following description will be given focusing on differences.

In the node terminal C100, an application that implements a practical function by working in cooperation with an OS (operating system) that is the basic software of the node terminal has been installed. Various types of processing operations performed by the node terminal C100 in the system according to the present embodiment are implemented by reading software provided by the application. It is assumed that the application includes software for utilizing the basic functions of the OS installed on the node terminal. The OS installed on the node terminal may include software for implementing the processing according to the present embodiment.

The decoding unit C106 decodes the encoded content data delivered from the delivery server A100. The decoded content data is recorded in the recording medium C110, and displayed (reproduced) on the display unit C105 in response to a user operation from the operation unit C104.

The routers D100 are relay devices that respectively connect the delivery server A100, the connection control server B100, and the node terminal C100 to the network E100 via the communication units A120, B120, and C120. Also, the routers D100 function as access points of a wireless LAN. As a result of connecting to the network E100 via the communication units A120, B120, and C120, the delivery server A100, the connection control server B100, and the node terminal C100 perform wireless communication.

Delivery Topology Construction Processing

Delivery topology construction processing performed by the connection control server B100 according to the present embodiment will be described next with reference to FIGS. 2, 3, and 4.

Figure 2:
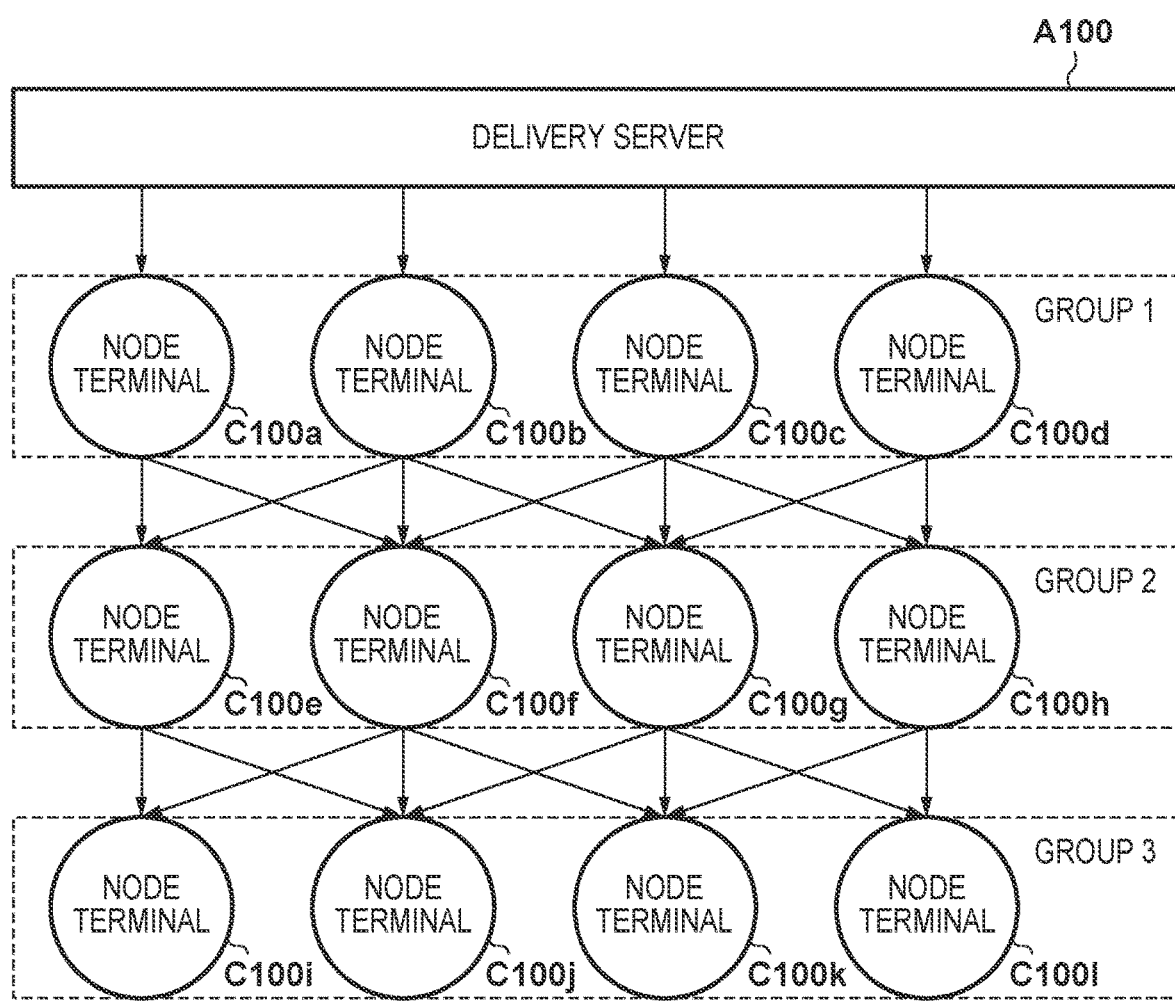
FIG. 2 is a diagram showing a configuration of a delivery topology according to the present embodiment.

FIG. 2 is a configuration diagram showing a delivery topology according to the present embodiment.

The network connections between the delivery server A100 and the node terminal C100 are indicated by arrows, and the direction of each arrow indicates the direction of the flow of data. Also, in the present embodiment, as the node terminal C100, node terminals C100a to C100l are added to the delivery topology in alphabetical order of the suffix. Also, although not shown, it is assumed that the connection control server B100 is communicably connected to the delivery server A100 and all node terminals C100 via a network.

In the present embodiment, it is assumed that node terminals C100a to C100d belong to group 1, node terminals C100e to C100h belong to group 2, node terminals C100i to C100l belong to group 3, and each group is connected only to adjacent groups in higher and lower hierarchical levels. That is, group 1 is connected to the delivery server A100 and group 2. Group 2 is connected to group 1 and group 3. Group 3 is connected to group 2 alone. The node terminals in the same group are not connected to each other.

In the present embodiment, control processing, which will be described later, is performed so as to avoid a situation in which, if disassociation of a node terminal from the delivery topology occurs, the node terminals that were receiving content from the disassociated node terminal simultaneously re-connect to the delivery server, resulting in an increase in the load on the delivery server. Accordingly, instead of re-connecting to the delivery server, the node terminals that were receiving content from the disassociated node terminal re-connect to a node terminal that belongs to one higher group of the group to which the disassociated node terminal belonged, and receive the content. With this configuration, a situation can be avoided in which the number of node terminals re-connecting to the delivery server increases abruptly, and the load on the delivery server increases.

Figure 3:
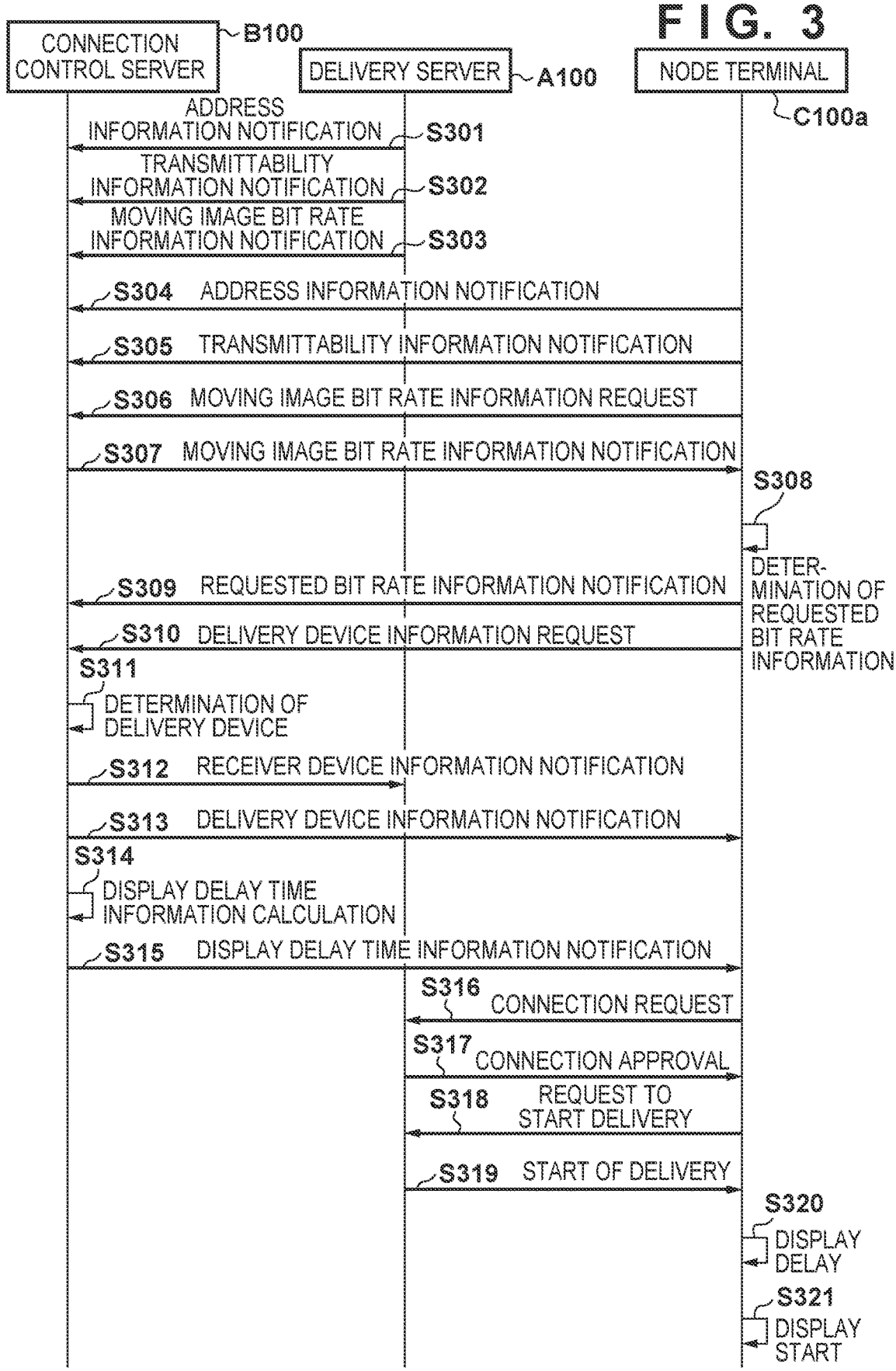
FIG. 3 is a sequence diagram of construction processing of the delivery topology according to the present embodiment.

FIG. 3 is a sequence diagram showing the procedure of delivery topology construction processing including adding the delivery server A100 and adding the node terminal C100a shown in FIG. 2.

Adding Processing of Delivery Server A100 to Delivery Topology

First, adding processing of the delivery server A100 to the delivery topology will be described.

In step S301, the delivery server A100 notifies the connection control server B100 of address information. As used herein, the address information refers to identification information required to establish a network connection such as the IP address.

In step S302, the delivery server A100 notifies the connection control server B100 of transmittability information. As used herein, the transmittability information refers to the data transmission rate of the delivery server A100 to the delivery topology. The transmittability information may be set in advance based on the type of communication line connected to the delivery server A100, or may be a result obtained as a result of the delivery server A100 experimentally measuring the communication rate immediately before the delivery server A100 notifies the connection control server B100 of transmittability information.

In step S303, the delivery server A100 notifies the connection control server B100 of moving image bit rate information. As used herein, the moving image bit rate information refers to requisite bit rate information required to reproduce content recorded in the recording medium A110 of the delivery server A100. In view of the performance of the receiver device, delivery content with a plurality of moving image bit rates may be provided, and the connection control server B100 may be notified of the plurality of moving image bit rates.

Adding Processing of Node Terminal C100a to Delivery Topology

Next, adding processing of the node terminal C100a to the delivery topology will be described.

In step S304, as in step S301, the node terminal C100a notifies the connection control server B100 of address information.

In step S305, as in step S302, the node terminal C100a notifies the connection control server B100 of transmittability information.

In step S306, the node terminal C100a transmits a request for moving image bit rate information to the connection control server B100.

In step S307, the connection control server B100 notifies the node terminal C100a of the moving image bit rate information. The moving image bit rate information that the node terminal C100A is notified of is the moving image bit rate information notified from the delivery server A100 in step S303.

In step S308, the node terminal C100a determines a moving image bit rate designated by a user operation from among the moving image bit rates notified from the connection control server B100 in step S307, as requested bit rate information.

In step S309, the node terminal C100a notifies the connection control server B100 of the requested bit rate information.

In step S310, the node terminal C100a transmits a request for delivery device information to the connection control server B100. As used herein, the delivery device information refers to identification information of a device for transmitting delivery content to the node terminal C100a, the identification information being required to establish a network connection such as an IP address.

In step S311, in response to the request for delivery device information from the node terminal C100a received in step S310, the connection control server B100 determines a delivery device to be notified. The method for determining the delivery device will be described in detail in the description of a flow of operations of the connection control server B100 given later. In the present embodiment, the delivery server A100 is determined as the delivery device.

In step S312, the connection control server B100 notifies the delivery server A100 of receiver device information. As used herein, the receiver device information refers to identification information of a device that has transmitted a network connection request to receive delivery content information, the identification information being required to establish a network connection such as an IP address. As a result of receiving the receiver device information, the delivery server A100 can specify the device from among the devices that will transmit a network connection request, and determine whether or not to allow a network connection. In the present embodiment, the receiver device is the node terminal C100a.

In step S313, the connection control server B100 notifies the node terminal C100a of delivery device information. As used herein, the delivery device information refers to identification information of a device for transmitting delivery content information, the identification information being required to establish a network connection such as an IP address.

In step S314, the connection control server B100 calculates display delay time information (reproduction start time) to be notified to the node terminal C100a. The calculation method will be described in detail in the description of a flow of operations of the connection control server B100 given later. In the present embodiment, the display delay time information of the node terminal C100a is calculated to be n seconds.

In step S315, the connection control server B100 notifies the node terminal C100a of the display delay time information.

In step S316, the node terminal C100a transmits a network connection request to the delivery server A100 in accordance with the delivery device information notified from the connection control server B100 in step S313.

In step S317, the delivery server A100 determines whether the network connection request received from the node terminal C100a in step S316 matches the receiver device information notified from the connection control server B100 in step S312. Then, if it is determined that the network connection request matches the receiver device information, the delivery server A100 approves the connection request and establishes a network connection.

In step S318, the node terminal C100a transmits a request to start delivering content to the delivery server A100.

In step S319, the delivery server A100 starts delivering the content requested by the node terminal C100a in step S318.

In step S320, the node terminal C100a delays the display of content in accordance with the display delay time information notified from the connection control server B100 in step S315.

In step S321, the node terminal C100a starts displaying delivery content.

The node terminals C100b to C100d also perform the processing in steps S304 to S321 in the same manner, and the node terminals C100b to C100d are thereby added to the delivery topology.

Adding Processing of Node Terminal C100e to Delivery Topology

Figure 4:
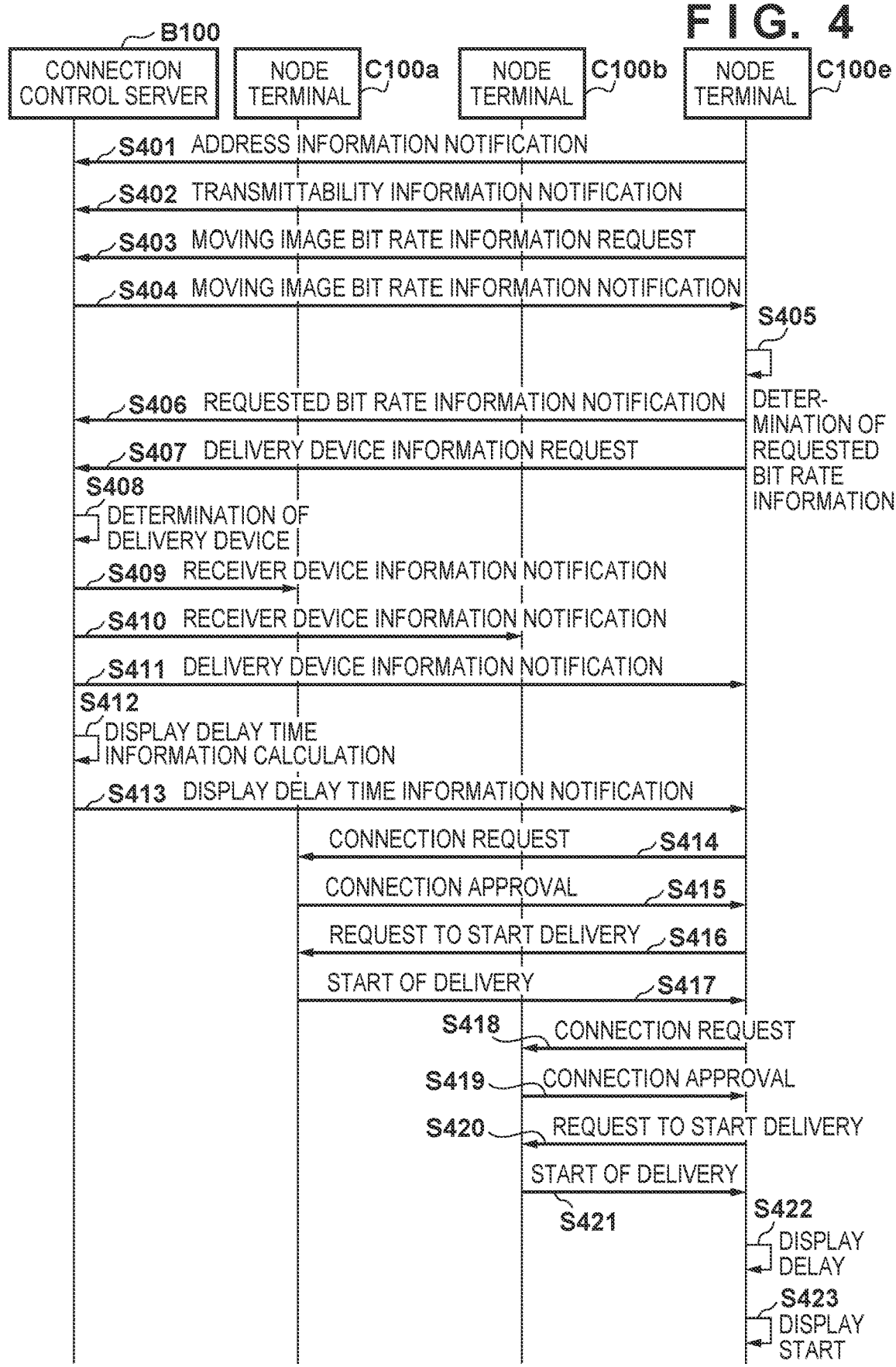
FIG. 4 is a sequence diagram of adding processing of adding a node terminal to the delivery topology according to the present embodiment.

FIG. 4 is a sequence diagram showing the procedure of adding processing of the node terminal C100e of group 2 shown in FIG. 2 to the delivery topology.

In step S401, as in step S304, the node terminal C100e notifies the connection control server B100 of address information.

In step S402, as in step S305, the node terminal C100e notifies the connection control server B100 of transmittability information.

In step S403, as in step S306, the node terminal C100e transmits a request for moving image bit rate information to the connection control server B100.

In step S404, as in step S307, the connection control server B100 notifies the node terminal C100e of the moving image bit rate information.

In step S405, as in step S308, the node terminal C100e determines requested bit rate information.

In step S406, as in step S309, the node terminal C100e notifies the connection control server B100 of the requested bit rate information.

In step S407, as in step S310, the node terminal C100e transmits a request for delivery device information to the connection control server B100.

In step S408, in response to the request for delivery device information from the node terminal C100e received in step S407, the connection control server B100 determines a delivery device to be notified. The method for determining the delivery device will be described in detail in the description of a flow of operations of the connection control server B100 given later. In the present embodiment, the node terminal C100a and the node terminal C100b are determined as the delivery device.

In step S409, as in step S312, the connection control server B100 notifies the node terminal C100a of receiver device information.

In step S410, as in step S409, the connection control server B100 notifies the node terminal C100b of the receiver device information.

In step S411, as in step S313, the connection control server B100 notifies the node terminal C100e of delivery device information.

In step S412, as in step S314, the connection control server B100 calculates display delay time information. In the present embodiment, the display delay time information of the node terminal C100e is calculated to be 2×n seconds.

In step S413, as in step S315, the connection control server B100 notifies the node terminal C100e of the display delay time information.

In step S414, as in step S316, the node terminal C100e transmits a network connection request to the node terminal C100a.

In step S415, as in step S317, the node terminal C100a approves the connection request and establishes a network connection.

In step S416, the node terminal C100e transmits a request to start delivering delivery content to the node terminal C100a.

In step S417, the node terminal C100a starts delivering the delivery content requested from the node terminal C100e in step S416.

In step S418, as in step S414, the node terminal C100e transmits a network connection request to the node terminal C100b.

In step S419, as in step S415, the node terminal C100b approves the connection request and establishes a network connection.

In step S420, the node terminal C100e transmits a request to start delivering delivery content to the node terminal C100b.

In step S421, the node terminal C100b starts delivering the delivery content requested from the node terminal C100e in step S420.

In step S422, the node terminal C100e delays the display of content in accordance with the display delay time information notified from the connection control server B100 in step S413.

In step S423, the node terminal C100e starts displaying delivery content.

In the present embodiment, the node terminal C100a and the node terminal C100b are used as the delivery devices, but not all terminals group 1 including the node terminals C100c and C100d may be used as the delivery devices. The node terminals C100f to C100h are also added to the delivery topology in the same manner.

Also, the adding processing of a node terminal of group 3 to the delivery topology is performed in the same manner except that group 1 used in the present embodiment is replaced by group 2.

Description of Operations of Connection Control Server B100

The operations for implementing the processing shown in FIGS. 3 and 4 performed by the connection control server B100 will be described next with reference to FIGS. 5A, 5B, 6, and 7.

Figure 5A:
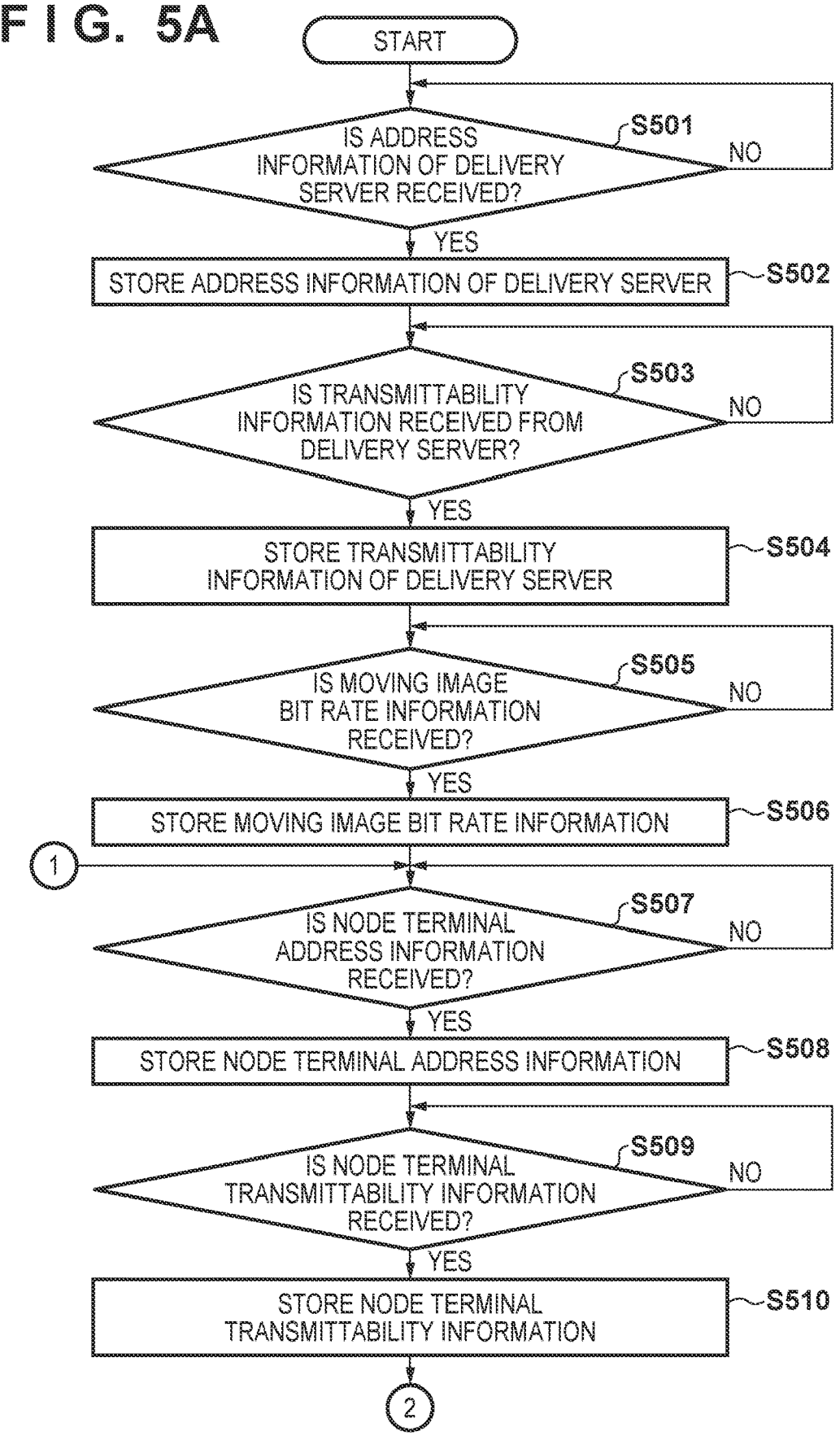
FIGS. 5A and 5B are flowcharts illustrating the operations of a connection control server in the adding processing of adding a node terminal to the delivery topology according to the present embodiment.
Figure 5B:
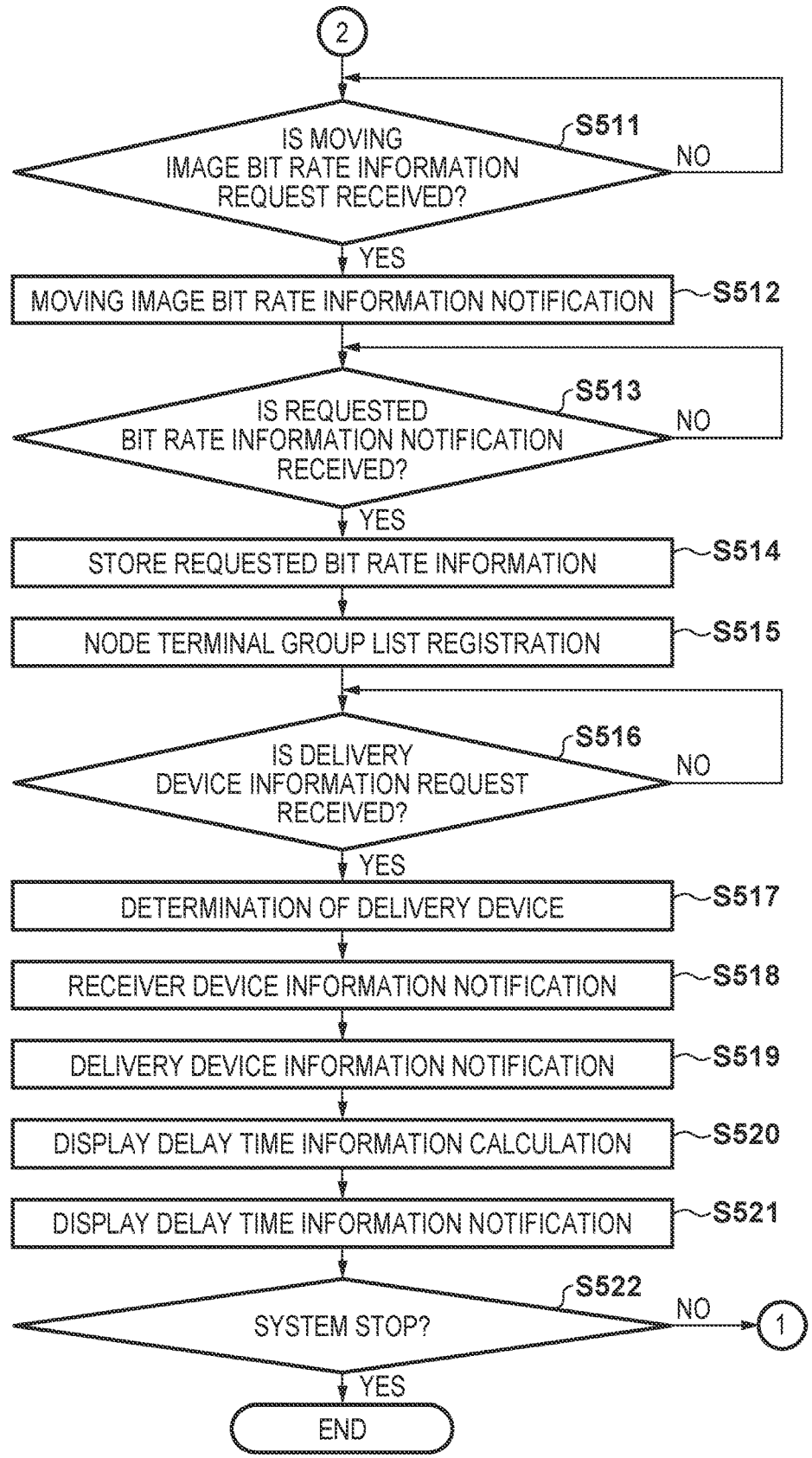

FIGS. 5A and 5B are flowcharts illustrating the operations of the connection control server B100 according to the present embodiment. The processing shown in FIGS. 5A and 5B is implemented by the control unit B101 of the connection control server B100 controlling the constituent units of the connection control server B100 in accordance with input signals and a program. The same applies to the flow of operations of the connection control server B100 described later.

In step S501, the control unit B101 determines whether or not address information has been received from the delivery server A100 via the communication unit B120. If it is determined that address information has been received, the procedure advances to the processing in step S502, otherwise the procedure returns to the processing in step S501.

In step S502, the control unit B101 stores the address information received in step S501 in the working memory B103. The processing in this step corresponds to the processing in step S301.

In step S503, the control unit B101 determines whether or not transmittability information has been received from the delivery server A100 via the communication unit B120. If it is determined that transmittability information has been received, the procedure advances to the processing in step S504, otherwise the procedure returns to the processing in step S503.

In step S504, the control unit B101 stores the transmittability information received in step S503 in the working memory B103. The processing in this step corresponds to the processing in step S302.

In step S505, the control unit B101 determines whether or not moving image bit rate information has been received from the delivery server A100 via the communication unit B120. If it is determined that moving image bit rate information has been received, the procedure advances to the processing in step S506, otherwise the procedure returns to the processing in step S505.

In step S506, the control unit B101 stores the moving image bit rate information received in step S505 in the working memory B103.

In step S507, the control unit B101 determines whether or not address information has been received from the node terminal C100 via the communication unit B120. If it is determined that address information has been received, the procedure advances to the processing in step S508, otherwise the procedure returns to the processing in step S507.

In step S508, the control unit B101 stores the address information received in step S507 in the working memory B103.

In step S509, the control unit B101 determines whether or not transmittability information has been received from the node terminal C100 via the communication unit B120. If it is determined that transmittability information has been received, the procedure advances to the processing in step S510, otherwise the procedure returns to the processing in step S509.

In step S510, the control unit B101 stores the transmittability information received in step S509 in the working memory B103.

In step S511, the control unit B101 determines whether or not a moving image bit rate information request has been received from the node terminal C100 via the communication unit B120. If it is determined that a moving image bit rate information request has been received, the procedure advances to the processing in step S512, otherwise the procedure returns to the processing in step S511.

In step S512, the control unit B101 notifies the node terminal C100 of the moving image bit rate information stored in the working memory B103 in step S506 via the communication unit B120. The processing in this step corresponds to the processing in step S307 or step S404.

In step S513, the control unit B101 determines whether or not requested bit rate information has been received from the node terminal C100 via the communication unit B120. If it is determined that requested bit rate information has been received, the procedure advances to the processing in step S514, otherwise the procedure returns to the processing in step S513.

In step S514, the control unit B101 stores the requested bit rate information received in step S513 in the working memory B103.

In step S515, the control unit B101 registers the information of the node terminal stored in the working memory B103 in steps S508, S510, and S514 in the working memory B103 as a group list (group information). FIG. 6 shows an example of a group list. The group list includes fields of at least group number 601, address information 602, transmittability information 603, and requested bit rate 604. The address information stored in step S508, the transmittability information stored in step S510, and the requested bit rate information stored in step S514 are registered in respective regions of the group list in association with each other. The group number 601 is set in ascending order from the group in the higher hierarchical level closest to the delivery server A100, and determined through group list registration processing, which will be described later.

Group List Registration Processing

Figure 7:
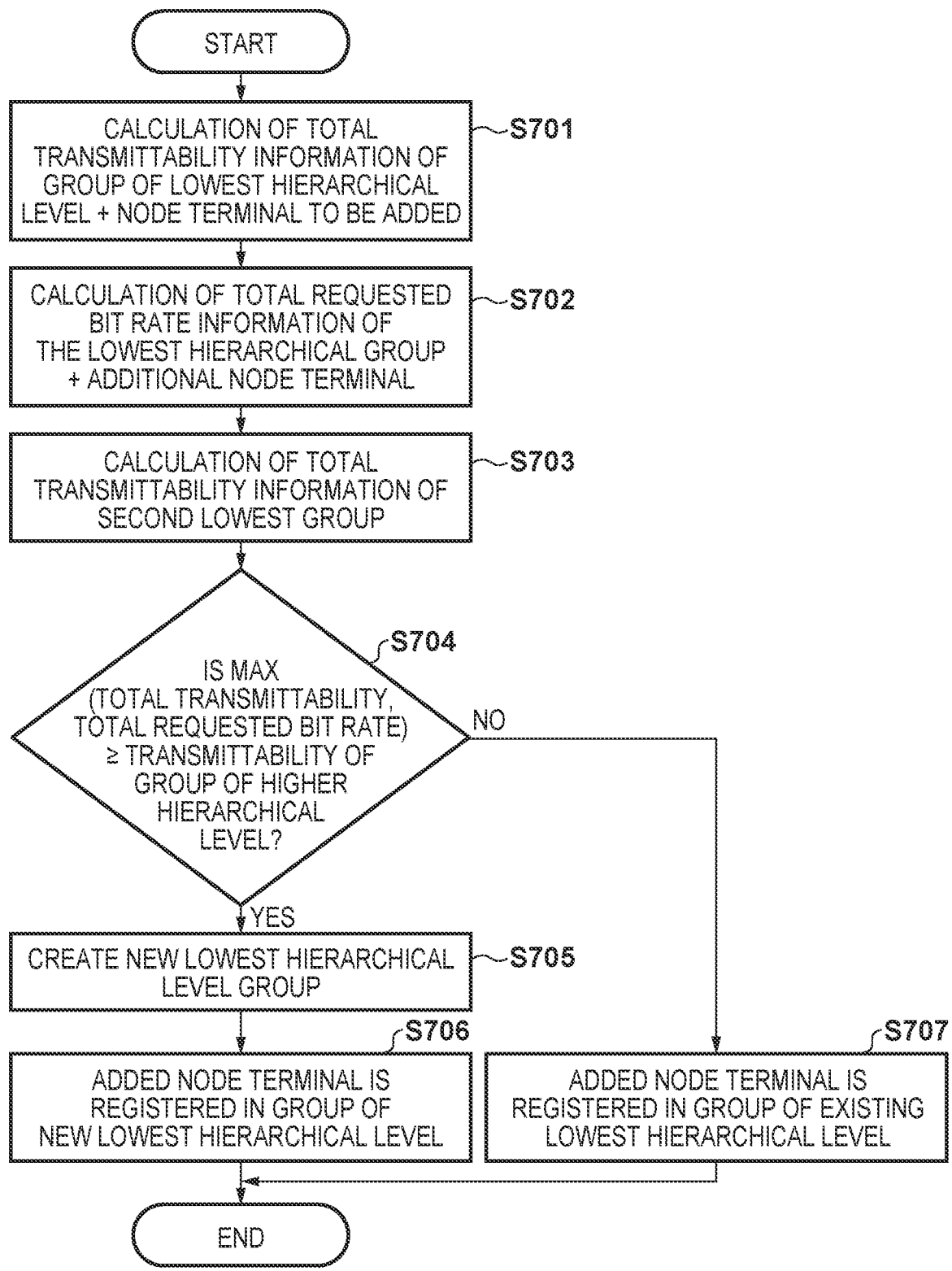
FIG. 7 is a flowchart illustrating group list registration processing according to the present embodiment.

FIG. 7 is a flowchart illustrating node terminal information group list registration processing.

In step S701, the control unit B101 refers to the group list, and calculates the total transmittability information of all node terminals that belong to the group in the lowest hierarchical level and the node terminal to be added. For example, in the case of the adding processing of the node terminal C100a shown in FIG. 3, the node terminal C100a is the node terminal that is registered first, and because there is no node terminal that belongs to the lowest hierarchical level in the group list, the transmittability information of the node terminal C100a is the total transmittability information. On the other hand, in the case of the adding processing of the node terminal C100e shown in FIG. 4, the node terminals C100a to C100d have already been registered in the group list. Accordingly, a sum obtained by adding the transmittability information of the node terminal C100e to the transmittability information of the node terminals C100a to C100d is the total transmittability information.

In step S702, the control unit B101 refers to the group list, and calculates the total requested bit rate information of all node terminals that belong to the group in the lowest hierarchical level and the node terminal to be added. In the case of the adding processing of the node terminal C100a shown in FIG. 3, the requested bit rate information of the node terminal C100a is the total requested bit rate information. In the case of the adding processing of the node terminal C100e shown in FIG. 4, a sum of the requested bit rate information of the node terminals C100a to C100e is the total requested bit rate information.

In step S703, the control unit B101 refers to the group list, and calculates the total transmittability information of all node terminals that belong to the second lowest group. For example, in the case of the adding processing of the node terminal C100a shown in FIG. 3, the second lowest group is the delivery server A100, and thus the transmittability information of the delivery server A100 is the total transmittability information. On the other hand, in the case of the adding processing of the node terminal C100e shown in FIG. 4, the second lowest group is group 1, and the total transmittability information of the node terminals C100a to C100d is the total transmittability information.

In step S704, the control unit B101 compares the total transmittability information calculated in step S701 with the total requested bit rate information calculated in step S702, and determines information having the higher bit rate. Then, the control unit B101 determines whether the information having a higher bit rate is greater than or equal to the total transmittability information of the second lowest group calculated in step S703. If it is determined that the information having the higher bit rate is greater than or equal to the total transmittability information, the procedure advances to the processing in step S705. If it is determined that the information having the higher bit rate is less than the total transmittability information, the procedure advances to the processing in step S707.

In step S705, the control unit B101 creates a group in an even lower hierarchical level in the group list. The control unit B101 refers to the group list, and stores a group number that is one higher than the highest group number in the working memory B103 as the group number of the node terminal to be added.

In step S706, the control unit B101 registers the group number stored in the working memory B103 in step S705 in the group list as the group number 601 of the node terminal to be added. Also, the control unit B101 registers the address information 602 stored in step S508, the transmittability information 603 stored in step S510, and the requested bit rate 604 stored in step S514 in association with each other.

In step S707, the control unit B101 refers to the group list, and registers the highest group number as the group number 601 of the node terminal to be added in the group list. In the group list, the address information 602 stored in step S508, the transmittability information 603 stored in step S510, and the requested bit rate 604 stored in step S514 are registered in association with each other.

In step S516, the control unit B101 determines whether or not a request for delivery device information has been received from the node terminal C100 via the communication unit B120. If it is determined that a request for delivery device information has been received, the procedure advances to the processing in step S517, otherwise the procedure returns to the processing in step S516.

In step S517, the control unit B101 determines, based on the group list registered in step S515, one or more node terminals that belong to the next higher group to the group to which the node terminal C100 that transmitted the request for delivery device information in step S516 belongs as the delivery device. At this time, any of the node terminals that belong to the next higher group may be selected as the node terminal determined as the delivery device. A node terminal that has sufficient transmittability may be selected, or a plurality of node terminals may be selected. The processing in this step corresponds to the processing in step S311 and step S408.

In step S518, the control unit B101 notifies all devices determined as the delivery devices in step S517 of the address information of the node terminal C100 as receiver device information via the communication unit B120. The processing in this step corresponds to the processing in step S312 and step S409.

In step S519, the control unit B101 notifies the node terminal C100 of the address information of all devices determined as the delivery devices in step S517 of delivery device information via the communication unit B120. The processing in this step corresponds to the processing in step S313 and step S411.

In step S520, the control unit B101 calculates display delay time information. As used herein, the display delay time information refers to the time required for the node terminal that has received delivery content to start displaying the content (reproduction start time). The unit time of the display delay time information is set to be longer than the time required for re-connection (re-construction of the delivery topology). For example, if the node terminals C100a to C100d that belong to group 1 shown in FIG. 2 disassociate from the delivery topology, the unit time is set to be longer than the time required for the node terminals C100e to C100h that belong to group 2 to re-establish the network connection with the delivery server A100. For this reason, the connection control server B100 may experimentally measure the network re-establishment time of each group before the delivery of delivery content starts, or may perform analysis of a re-establishment time that is considered as statistically sufficient and set a time longer than the re-establishment time. In the present embodiment, n seconds is set as the display delay time, and the display delay time is incremented as the hierarchical level to which the group belongs decreases. Specifically, the display delay time of group 1 shown in FIG. 2 is set to n seconds, the display delay time of group 2 is set to n×2 seconds, and the display delay time of group 3 is set to n×3 seconds.

By setting the display delay time in the manner described above, even if a node terminal performs disassociation and the transmission of delivery content stops at the node terminals that were receiving the delivery content from the node terminal, the node terminals that were receiving the delivery content from the node terminal re-connect to the node terminals of a group in the hierarchical level next higher than the group to which the disassociated node terminal belonged during the display delay time. With this configuration, the delivery topology can be re-constructed, without stopping the display of the delivery content. The display delay time may be changed according to the content. The processing in this step corresponds to the processing in step S314 and step S412.

In step S521, the control unit B101 notifies the node terminal C100 of the display delay time information calculated in step S520 via the communication unit B120. The processing in this step corresponds to the processing in step S315 and step S413.

In step S522, the control unit B101 determines whether or not an instruction to stop the system has been received from the user via the operation unit B104. If it is determined that an instruction to stop the system has been received, the processing ends, otherwise the procedure returns to the processing in step S507.

Description of Operations of Node Terminal C100

The operations for implementing the processing shown in FIGS. 3 and 4 performed by the node terminal C100 will be described next with reference to FIGS. 8A and 8B.

Figure 8A:
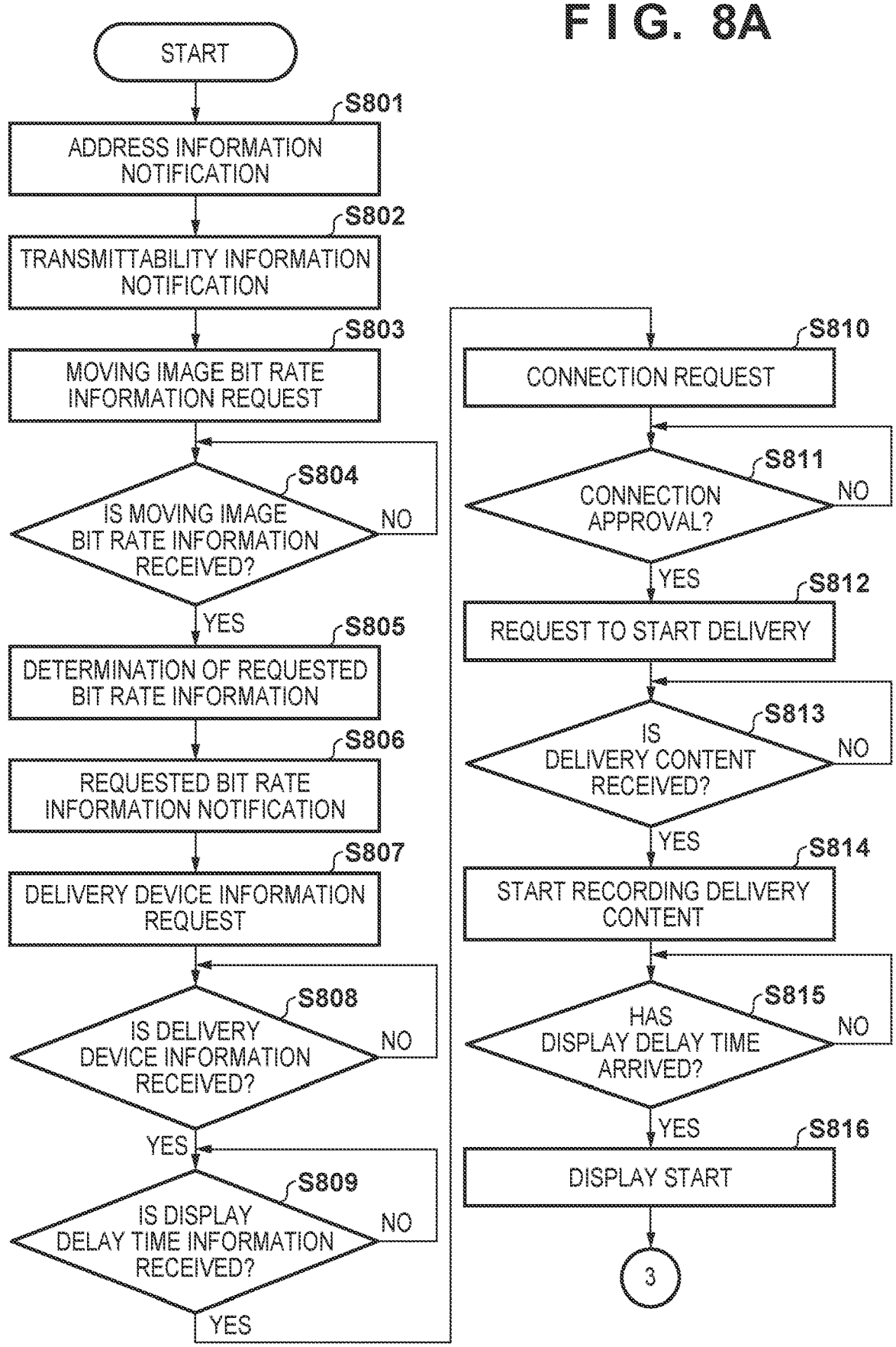
FIGS. 8A and 8B are flowcharts illustrating the operations of a node terminal in the adding processing of adding the node terminal to the delivery topology according to the present embodiment.
Figure 8B:
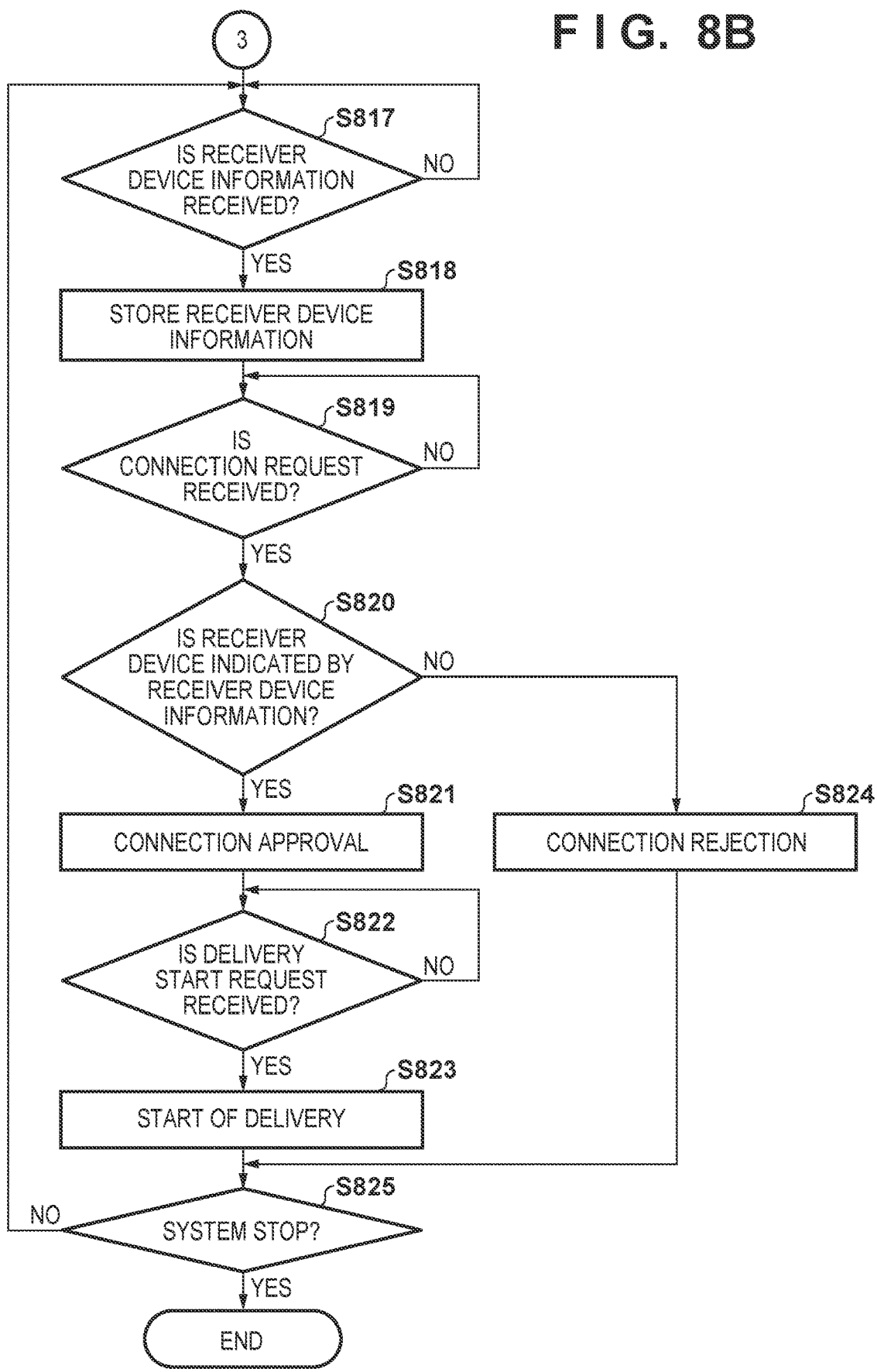

FIGS. 8A and 8B are flowcharts illustrating the operations of the node terminal C100 according to the present embodiment. The processing shown in the flowchart is implemented by the control unit C101 of the node terminal C100 controlling the constituent units of the node terminal C100 in accordance with input signals and a program. The same applies to the flow of operations of the node terminal C100 described later.

Operations of Receiving Delivery Content Performed by Node Terminal C100

The operations of receiving delivery content performed by the node terminal C100 will be described first.

In step S801, the control unit C101 notifies the connection control server B100 of address information stored in the working memory C103 via the communication unit C120. It is assumed here that the address information is acquired by the router D100 during network connection and is stored in advance in the working memory C103. It is also assumed that, during the operations of the present embodiment, network communication is performed as needed to keep the address information from changing. The processing in this step corresponds to the processing in step S304 and step S401.

In step S802, the control unit C101 notifies the connection control server B100 of the transmittability information stored in the working memory C103 via the communication unit C120. The processing in this step corresponds to the processing in step S305 and step S402.

In step S803, the control unit C101 notifies the connection control server B100 of a moving image bit rate information request via the communication unit C120. The processing in this step corresponds to the processing in step S306 and step S403.

In step S804, the control unit C101 determines whether or not moving image bit rate information has been received from the connection control server B100 via the communication unit C120. If it is determined that moving image bit rate information has been received, the procedure advances to the processing in step S805, otherwise the procedure returns to the processing in step S804.

In step S805, the control unit C101 presents the user the selective moving image bit rate information received in step S804 via the display unit C105, and determines the moving image bit rate information selected by the user via the operation unit C104 as requested bit rate information. The processing in this step corresponds to the processing in step S308 and step S405.

In step S806, the control unit C101 notifies the connection control server B100 of the requested bit rate information determined in step S805 via the communication unit C120. The processing in this step corresponds to the processing in step S309 and step S406.

In step S807, the control unit C101 notifies the connection control server B100 of the request for delivery device information via the communication unit C120. The processing in this step corresponds to the processing in step S310 and step S407.

In step S808, the control unit C101 determines whether or not delivery device information has been received from the connection control server B100 via the communication unit C120. If it is determined that delivery device information has been received, the procedure advances to the processing in step S809, otherwise the procedure returns to the processing in step S808.

In step S809, the control unit C101 determines whether or not display delay time information has been received from the connection control server B100 via the communication unit C120. If it is determined that display delay time information has been received, the procedure advances to the processing in step S810, otherwise the procedure returns to the processing in step S809.

In step S810, the control unit C101 notifies the device having the delivery device information received in step S808 of a connection request via the communication unit C120. The processing in this step corresponds to the processing in step S316, S414, and step S418.

In step S811, the control unit C101 determines whether or not a connection approval has been received from the device that was notified of a connection request in step S810 via the communication unit C120. If it is determined that a connection approval has been received, the procedure advances to the processing in step S812, otherwise the procedure returns to the processing in step S811.

In step S812, the control unit C101 notifies the device having the delivery device information received in step S808 of a delivery start request via the communication unit C120. The processing in this step corresponds to the processing in step S318, step S417, and step S420.

In step S813, the control unit C101 determines whether or not delivery content has been received from the device that was notified of a delivery start request in step S812 via the communication unit C120. If it is determined that delivery content has been received, the procedure advances to the processing in step S814, otherwise the procedure returns to the processing in step S813.

In step S814, the control unit C101 starts a recording task. In the recording task, an operation of recording the delivery content received in step S813 in the recording medium C110 is repeated each time a data packet of the delivery content is received. The recorded delivery content is used for a buffer for displaying the delivery content in step S816, which will be described later, and also used to transmit to the node terminals that belong to the group in the lower hierarchical level. Accordingly, recording the delivery content into the recording medium C110 is continued until the delivery of the content is completed.

In step S815, the control unit C101 determines whether or not the display delay time indicated by the display delay time information received in step S809 via the communication unit C120 has arrived. If it is determined that the start time has arrived, the procedure advances to the processing in step S816, otherwise the procedure returns to the processing in step S815.

In step S816, the control unit C101 decodes the delivery content recorded in the recording medium C110 using the decoding unit C106, and displays the decoded content data on the display unit C105. The display processing is continued until the delivery of the content is completed, or until an instruction to stop displaying the content is received from the user via the operation unit C104. The processing in this step corresponds to the processing in step S321 and step S423.

Operations of Transmitting Delivery Content Performed by Node Terminal C100

The operations of transmitting delivery content performed by the node terminal C100 will be described next.

In step S817, the control unit C101 determines whether or not receiver device information has been received from the connection control server B100 via the communication unit C120. If it is determined that receiver device information has been received, the procedure advances to the processing in step S818, otherwise the procedure returns to the processing in step S817.

In step S818, the control unit C101 stores the receiver device information received in step S817 in the working memory C103.

In step S819, the control unit C101 determines whether or not a connection request has been received from the receiving node terminal C100 via the communication unit C120. If it is determined that a connection request has been received, the procedure advances to the processing in step S820, otherwise the procedure returns to the processing in step S819.

In step S820, the control unit C101 determines whether or not the connection request received in step S819 is the connection request from the receiver device indicated by the receiver device information stored in the working memory C103 in step S818. If it is determined that the connection request is the connection request from the receiver device indicated by the receiver device information, the procedure advances to the processing in step S821, otherwise the procedure advances to the processing in step S824.

In step S821, the control unit C101 approves the connection request received in step S819, and establishes a network connection with the receiving node terminal C100 via the communication unit C120. The processing in this step corresponds to the processing in step S415 and step S419.

In step S822, the control unit C101 determines whether or not a delivery start request has been received from the receiving node terminal C100 via the communication unit C120. If it is determined that a delivery start request has been received, the procedure advances to the processing in step S823, otherwise the procedure returns to the processing in step S822.

In step S823, the control unit C101 starts a delivery task. In the delivery task, the control unit C101 repeats an operation of delivering the delivery content recorded in the recording medium C110 to the receiving node terminal C100 via the communication unit C120. The processing in this step corresponds to the processing in step S417 and step S421.

In step S824, the control unit C101 rejects the connection request received in step S819.

In step S825, the control unit C101 determines whether or not an instruction to stop the system has been received from the user via the operation unit C104. If it is determined that an instruction to stop the system has been received, the processing ends, otherwise the procedure returns to the processing in step S817.

Description of Operations of Delivery server A100

The operations for implementing the processing shown in FIG. 3 performed by the delivery server A100 will be described next with reference to FIG. 9.

Figure 9:
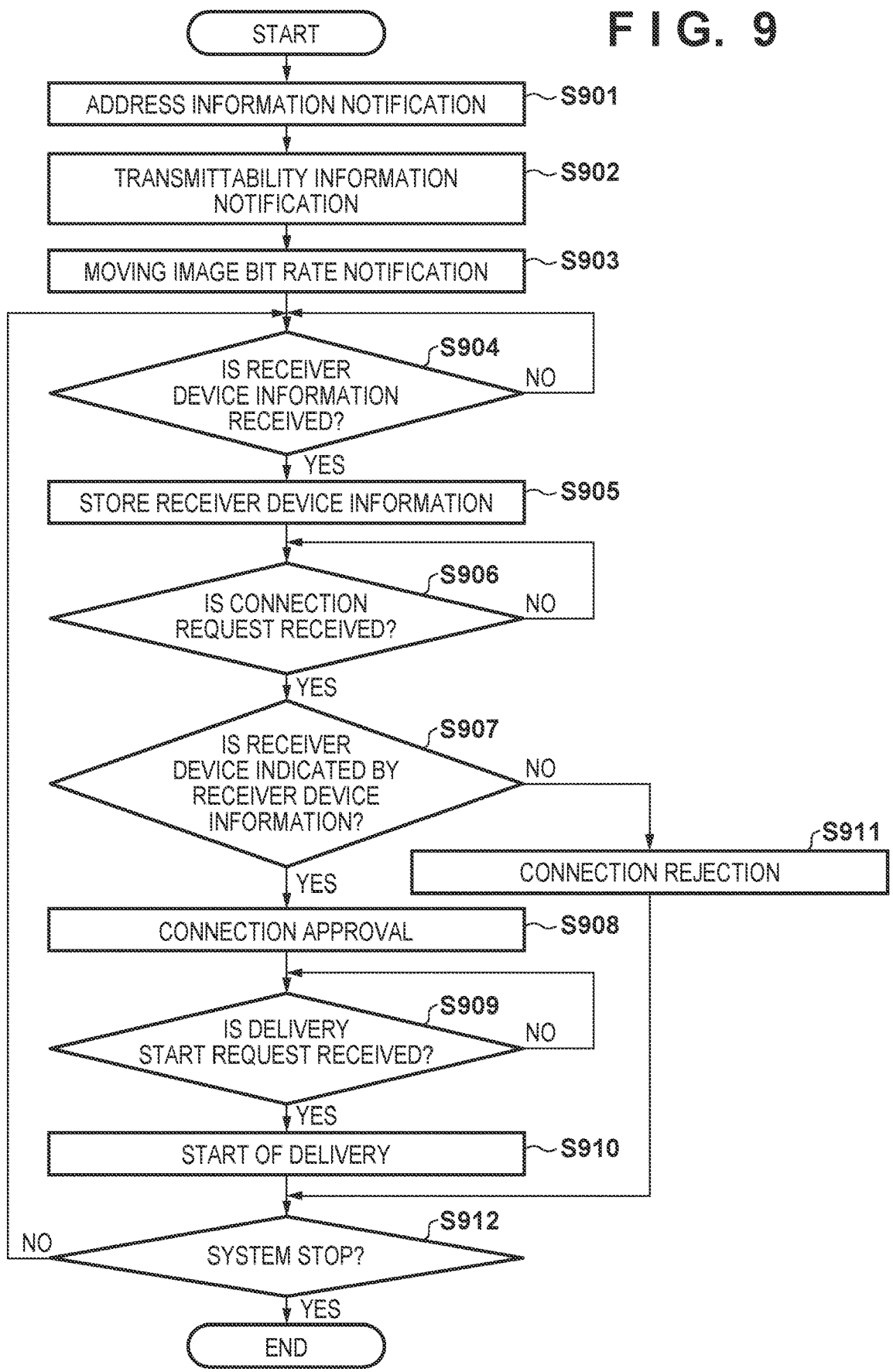
FIG. 9 is a flowchart illustrating the operations of a delivery server in the adding processing of adding a node terminal to the delivery topology according to the present embodiment.

FIG. 9 is a flowchart illustrating the operations of the delivery server A100 according to the present embodiment. The processing shown in FIG. 9 is implemented by the control unit A101 of the delivery server A100 controlling the constituent units of the delivery server A100 in accordance with input signals and a program. The same applies to the flow of operations of the delivery server A100 described later.

In step S901, the control unit A101 notifies the connection control server B100 of the address information stored in the working memory A103 via the communication unit A120. The processing in this step corresponds to the processing in step S301.

In step S902, the control unit A101 notifies the connection control server B100 of the transmittability information stored in the working memory C103 via the communication unit A120. The processing in this step corresponds to the processing in step S302.

In step S903, the control unit A101 notifies the connection control server B100 of moving image bit rate information via the communication unit A120. The processing in this step corresponds to the processing in step S303.

In step S904, the control unit A101 determines whether or not receiver device information has been received from the connection control server B100 via the communication unit A120. If it is determined that receiver device information has been received, the procedure advances to the processing in step S905, otherwise the procedure returns to the processing in step S904.

In step S905, the control unit A101 stores the receiver device information received in step S904 in the working memory A103. The processing in this step corresponds to the processing in step S312.

In step S906, the control unit A101 determines whether or not a connection request has been received from the node terminal C100 via the communication unit A120. If it is determined that a connection request has been received, the procedure advances to the processing in step S907, otherwise the procedure returns to the processing in step S906.

In step S907, the control unit A101 determines whether or not the connection request received in step S906 is the connection request from the receiver device indicated by the receiver device information stored in the working memory A103 in step S905. If it is determined that the connection request is the connection request from the receiver device indicated by the receiver device information, the procedure advances to the processing in step S908, otherwise the procedure advances to the processing in step S911.

In step S908, the control unit A101 approves the connection request received in step S906, and establishes a network connection with the node terminal C100 via the communication unit A120. The processing in this step corresponds to the processing in step S317.

In step S909, the control unit A101 determines whether or not a delivery start request has been received from the node terminal C100 via the communication unit A120. If it is determined that a delivery start request has been received, the procedure advances to the processing in step S910, otherwise the procedure returns to the processing in step S909.

In step S910, the control unit A101 starts delivering the delivery content recorded in the recording medium A110 to the node terminal C100 via the communication unit A120. The processing in this step corresponds to the processing in step S319.

In step S911, the control unit A101 rejects the connection request received in step S906.

In step S912, the control unit A101 determines whether or not an instruction to stop the system has been received from the user via the operation unit A104. If it is determined that an instruction to stop the system has been received, the processing ends, otherwise the procedure returns to the processing in step S904.

Re-Construction Processing of Delivery Topology

Re-construction processing of a delivery topology performed by the connection control server B100 according to the present embodiment will be described next with reference to FIGS. 10 and 11.

FIG. 10 is a configuration diagram of a delivery topology re-constructed after disassociation of a node terminal according to the present embodiment.

If a node terminal disassociates from the delivery topology, the delivery topology is re-constructed such that the node terminals that were receiving delivery content from that node terminal can receive the delivery content from a node terminal of a group in the next higher hierarchical level to the node terminal that has disassociated (disassociated node terminal), which was transmitting the delivery content to the disassociated node terminal. In FIG. 10, the node terminal C100a has disassociated from the delivery topology, and thus the delivery topology is re-constructed such that the node terminals C100e and C100f that were receiving delivery content from the node terminal C100a can receive the delivery content from the delivery server A100 that was transmitting the delivery content to the node terminal C100a.

Disassociation Processing of Node Terminal C100a from Delivery Topology

Figure 11:
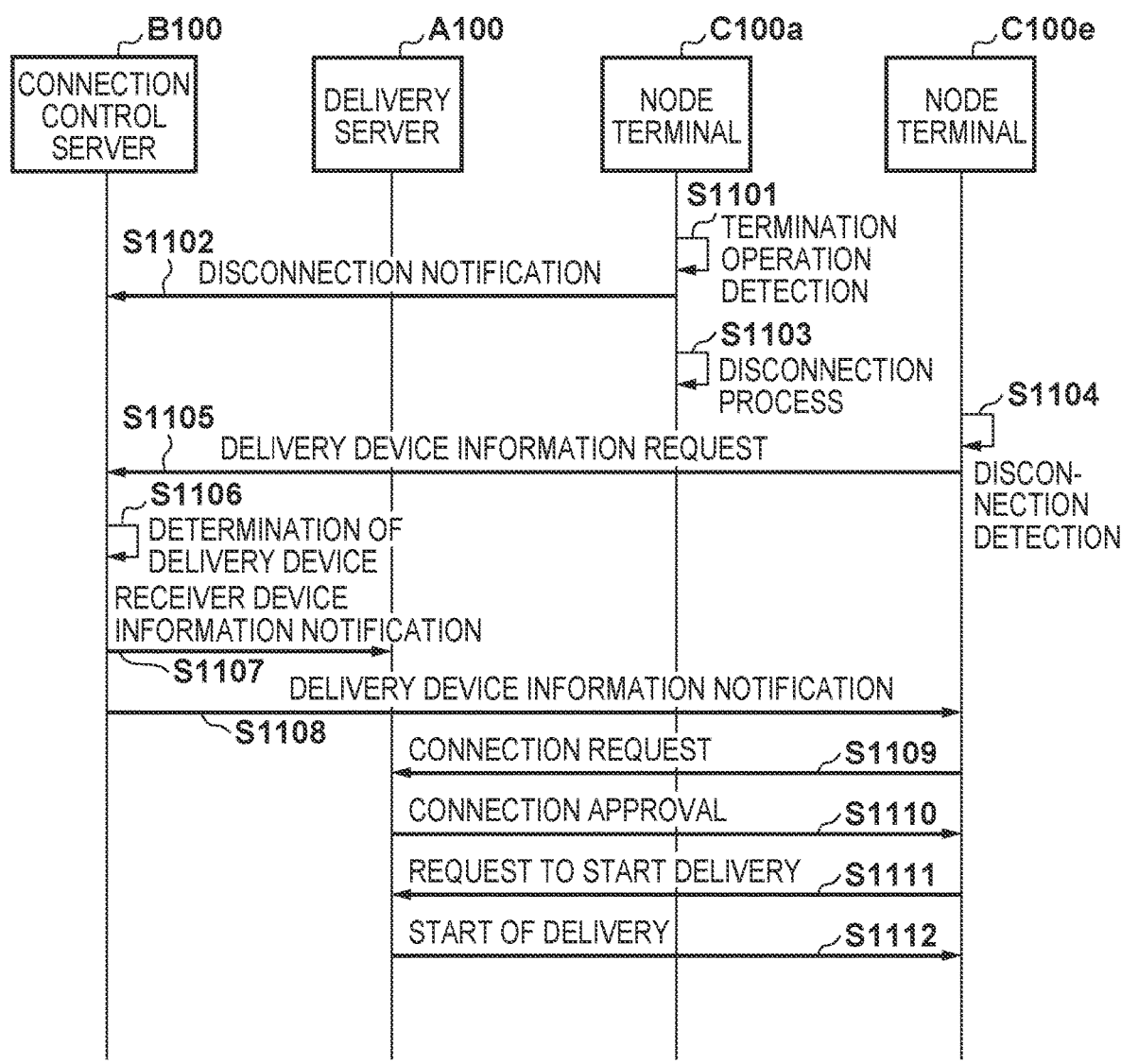
FIG. 11 is a sequence diagram of disassociation processing of the node terminal from the delivery topology according to the present embodiment.

FIG. 11 is a sequence diagram showing the procedure of disassociation processing of the node terminal C100a from the delivery topology shown in FIG. 10.

In step S1101, the node terminal C100a detects a termination operation from the user.

In step S1102, the node terminal C100a transmits a network disconnection notification (disassociation notification) for disassociating from the delivery topology to the connection control server B100.

In step S1103, the node terminal C100a disconnects the network.

In step S1104, the node terminal C100e detects the disconnection of the network connection to the node terminal C100a.

In step S1105, as in step S407, the node terminal C100e transmits a request for delivery device information to the connection control server B100.

In step S1106, in response to the request for delivery device information from the node terminal C100e received in step S1105, the connection control server B100 determines a delivery device to be notified. The method for determining the delivery device will be described in detail in the description of a flow of operations of the connection control server B100 given later. In the present embodiment, the delivery server A100 is determined as the delivery device.

In step S1107, as in step S409, the connection control server B100 notifies the delivery server A100 of the receiver device information.

In step S1108, as in step S411, the connection control server B100 notifies the node terminal C100e of the delivery device information.

In step S1109, as in step S418, the node terminal C100e transmits a network connection request to the delivery server A100.

In step S1110, as in step S419, the delivery server A100 approves the connection request and establishes a network connection.

In step S1111, the node terminal C100e transmits a request to start delivering delivery content to the delivery server A100.

In step S1112, the delivery server A100 starts delivering the delivery content for which the request was received from the node terminal C100e in step S1111.

The re-construction of the delivery topology by the node terminal C100f is also performed in the same manner as the processing in step S1104 to S1112 performed by the node terminal C100e. Also, the same processing is performed when a node terminal other than the node terminal C100a performs disassociation.

Description of Operations of Connection Control Server B100

The operations for implementing the processing shown in FIGS. 10 and 11 performed by the connection control server B100 will be described next with reference to FIG. 12.

Figure 12:
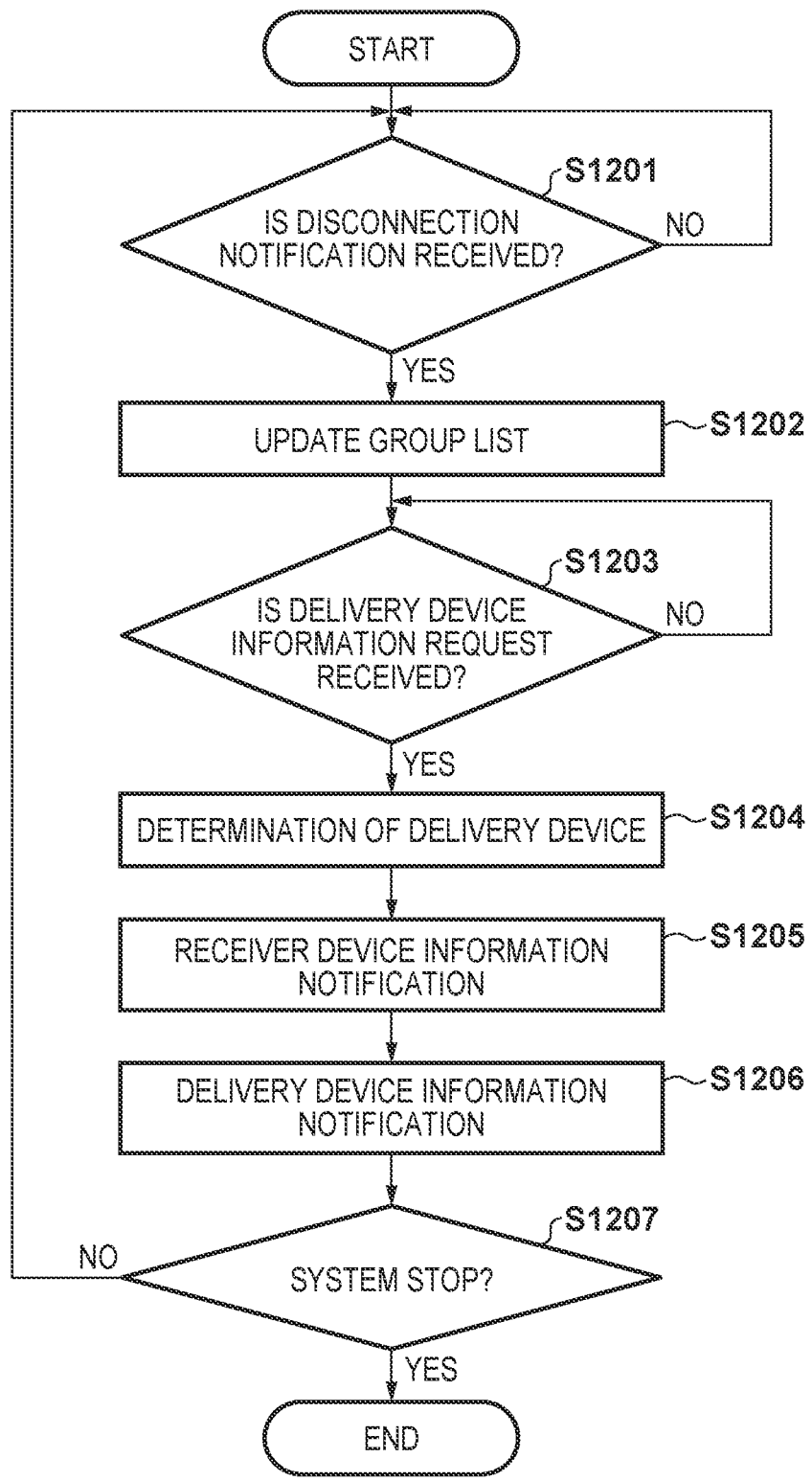
FIG. 12 is a flowchart illustrating the operations of a connection control server in the disassociation processing of the node terminal from the delivery topology according to the present embodiment.

FIG. 12 is a flowchart illustrating the operations of the connection control server B100 during processing of disassociation of a node terminal from the delivery topology according to the present embodiment.

In step S1201, the control unit B101 determines whether or not a disconnection notification has been received from a node terminal C100 via the communication unit B120. If it is determined that a disconnection notification has been received, the procedure advances to the processing in step S1202, otherwise the procedure returns to the processing in step S1201.

In step S1202, the control unit B101 removes the information of the node terminal C100 from which the disconnection notification was received in step S1201 from the group list stored in the working memory B103.

In step S1203, the control unit B101 determines whether or not a request for delivery device information has been received from the node terminal C100 via the communication unit B120. If it is determined that a request for delivery device information has been received, the procedure advances to the processing in step S1204, otherwise the procedure returns to the processing in step S1203.

In step S1204, the control unit B101 refers to the group list stored in the working memory B103, and determines a node terminal C100 that was transmitting delivery content to the node terminal C100 from which the disconnection notification was received in step S1201 as a delivery device. The processing in this step corresponds to the processing in step S1106.

In step S1205, the control unit B101 notifies the delivery device determined in step S1204 of the device from which the request for delivery device information was received in step S1203 as a receiver device via the communication unit B120. The processing in this step corresponds to the processing in step S1107.

In step S1206, the control unit B101 notifies the receiver device notified in step S1205 of the delivery device determined in step S1204 via the communication unit B120. The processing in this step corresponds to the processing in step S1108.

In step S1207, the control unit B101 determines whether or not an instruction to stop the system has been received from the user via the operation unit B104. If it is determined that an instruction to stop the system has been received, the processing ends, otherwise the procedure returns to the processing in step S1201.

Description of Operations of Disassociated Node Terminal C100a

Figure 13:
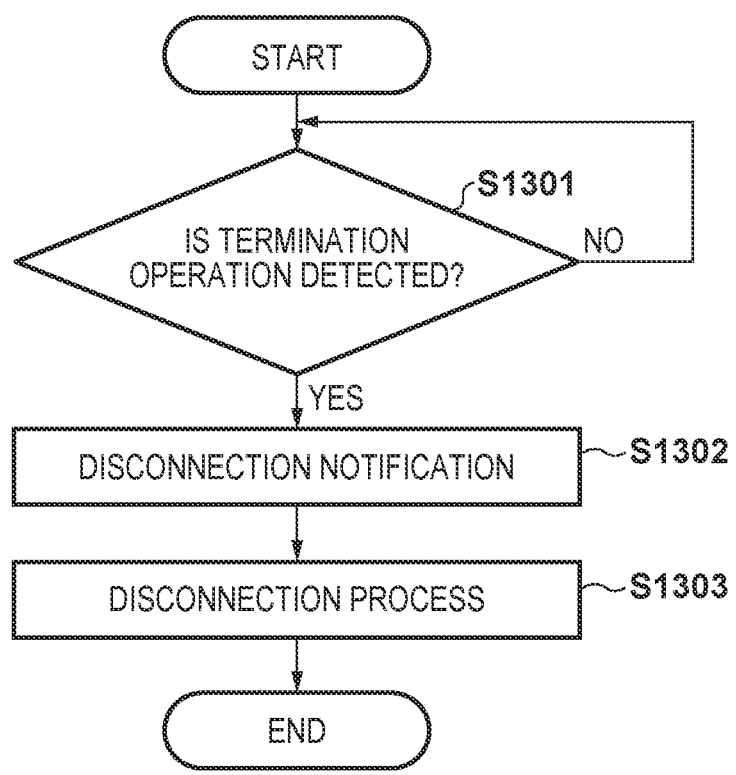
FIG. 13 is a flowchart illustrating the operations of the node terminal that disassociates in the disassociation processing from the delivery topology according to the present embodiment.

The operations for implementing the processing shown in FIGS. 10 and 11 performed by the disassociated node terminal C100a will be described next with reference to FIG. 13.

In step S1301, the control unit C101 determines whether or not an instruction to end viewing has been received from the user via the operation unit C104. If it is determined that an instruction to end viewing has been received, the procedure advances to the processing in step S1302, otherwise the procedure returns to the processing in step S1301.

In step S1302, the control unit C101 notifies the connection control server B100 of a network disconnection via the communication unit C120. The processing in this step corresponds to the processing in step S1102.

In step S1303, the control unit C101 disconnects the network via the communication unit C120. The processing in this step corresponds to the processing in step S1103.

In the present embodiment, an example has been described in which the node terminal C100a performs disassociation, but the same applies when another node terminal C100 performs disassociation.

Figure 14:
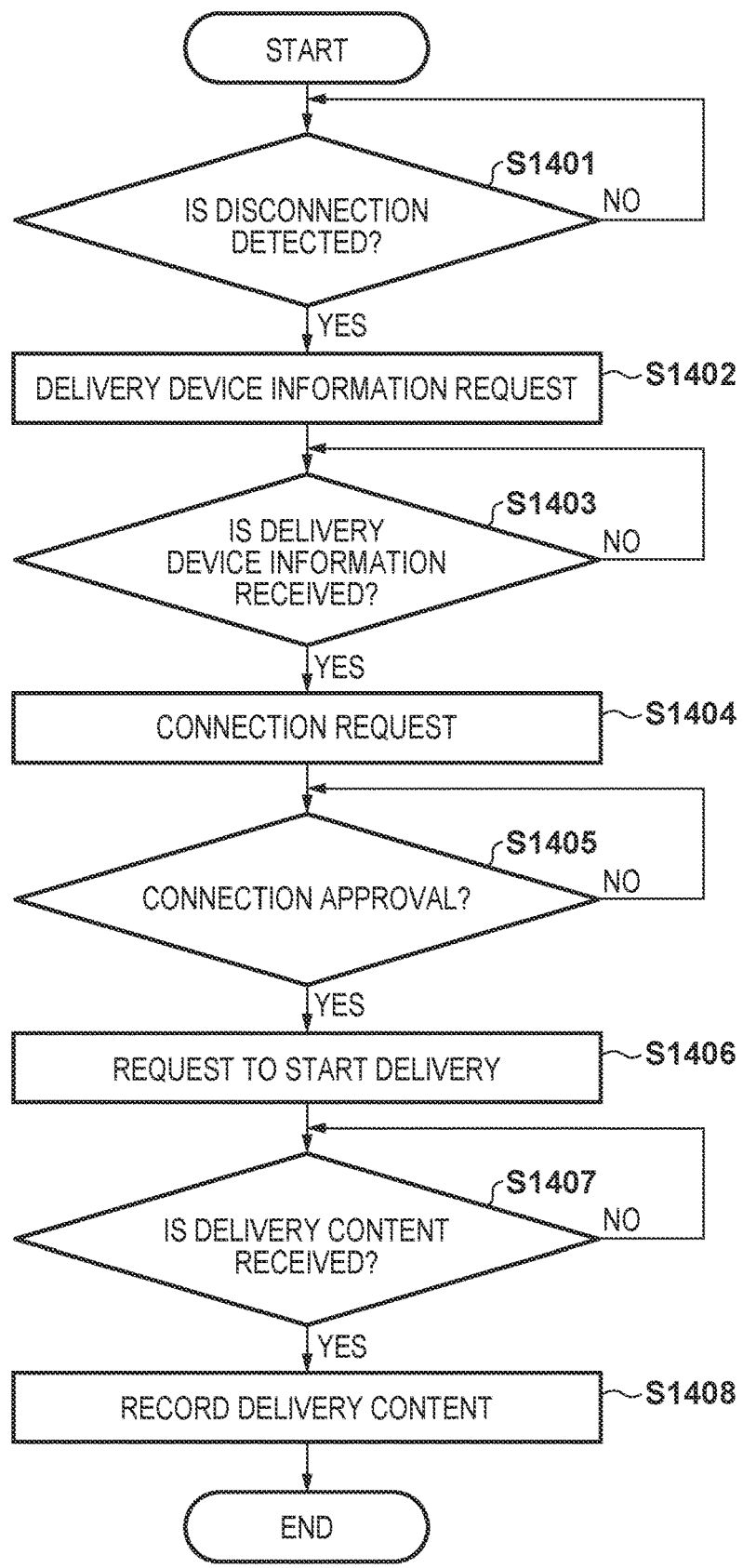
FIG. 14 is a flowchart illustrating the operations of a node terminal in a lower hierarchical level of the node terminal that has disassociated through the disassociation processing from the delivery topology according to the present embodiment.

Description of Operations of Node Terminal C100e Receiving Delivery Content from Disassociated Node Terminal C100a The operations for implementing the processing shown in FIGS. 10 and 11 performed by the node terminal C100e that was receiving delivery content from the disassociated node terminal C100a will be described next with reference to FIG. 14.

In S1401, the control unit C101 determines whether or not the network connection with the node terminal C100a has been disconnected via the communication unit C120. If it is determined that the network connection has been disconnected, the procedure advances to the processing in S1402, otherwise the procedure returns to the processing in S1401.

In S1402, the control unit C101 notifies the connection control server B100 of a request for delivery device information via the communication unit C120. The processing in this step corresponds to the processing in S1105.

In step S1403, the control unit C101 determines whether or not delivery device information has been received from the connection control server B100 via the communication unit C120. If it is determined that delivery device information has been received, the procedure advances to the processing in step S1404, otherwise the procedure returns to the processing in step S1403.

In step S1404, the control unit C101 notifies the device having the delivery device information received in step S1403 of a connection request via the communication unit C120. The processing in this step corresponds to the processing in step S1109.

In step S1405, the control unit C101 determines whether or not a connection approval has been received from the device that notified the connection request in step S1404 via the communication unit C120. If it is determined that a connection approval has been received, the procedure advances to the processing in step S1406, otherwise the procedure returns to the processing in step S1405.

In step S1406, the control unit C101 notifies the device having the delivery device information received in step S1403 of a delivery start request via the communication unit C120. The processing in this step corresponds to the processing in step S1111.

In step S1407, the control unit C101 determines whether or not delivery content has been received from the device that was notified of the delivery start request in step S1406 via the communication unit C120. If it is determined that delivery content has been received, the procedure advances to the processing in step S1408, otherwise the procedure returns to the processing in step S1407.

In step S1408, the control unit B101 records the delivery content received in step S1407 in the recording medium C110.

In the present embodiment, an example has been described in which the node terminal C100a performs disassociation, but the same applies when another node terminal C100 performs disassociation.

Also, in the present embodiment, an example has been described in which a connection is established to the delivery server A100 instead of the disassociated node terminal C100a, but a connection may be established to a node terminal C100 that belongs to group 1 that is the same group to which the node terminal C100a belongs and has a sufficient communication capacity.

As described above, according to the present embodiment, in a node terminal that was receiving delivery content from the disassociated node terminal, the display of the content is delayed relative to that of the disassociated node terminal until re-construction of the delivery topology is completed. Then, the node terminal redundantly stores at least the delivery content corresponding to the delay time in its buffer, and is re-connected to a node terminal that was transmitting the delivery content to the disassociated node terminal while the content corresponding to the delay time is displayed, and the transmission of the delivery content is thereby resumed. It is thereby possible to avoid a situation in which the display of the delivery content stops.

Also, the delivery topology is hierarchically constructed for each group of node terminals. Also, if a node terminal disassociates from the delivery topology, the delivery topology is re-constructed such that a node terminal of a group in the higher hierarchical level to the disassociated node terminal can receive the delivery content from a node terminal that were receiving the delivery content from the disassociated node terminal. This configuration prevents generation of an extremely large number of re-connection requests to the delivery server, and thus the load on the delivery server until the delivery topology is re-constructed can be reduced.

In the present embodiment, an example has been descried in which node terminals belong to groups in order such that a node terminal joined earlier belongs to a group in a higher hierarchical level, but the node terminals may be grouped according to other conditions. For example, a configuration may be possible in which a charged user belongs to a group in a higher hierarchical level where delay is less likely to occur, or the node terminal of a user who tends to view a program to the end, determined based on the viewing history in the past, belongs to a group in a lower hierarchical level. Also, as in an automatic recording function, node terminals scheduled to perform disassociation at a predetermined time may belong to separate groups so as to prevent the node terminals from simultaneously performing disassociation and affecting the delivery topology.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125287, filed Jun. 29, 2018 which is hereby incorporated by reference herein in its entirety.

What is claimed is:

1. A system which includes a plurality of communication apparatuses grouped into groups, a delivery apparatus that delivers content to the communication apparatuses that belong to the groups, and a communication control apparatus that performs grouping,
   wherein the communication control apparatus includes a processor and a memory coupled to the processor and storing instructions that, when executed by the processor, cause the processor to:
   group the plurality of communication apparatuses and construct a hierarchical delivery topology;
   determine a content reproduction start time to start reproducing the content for each of the groups;
   notify the communication apparatuses in each of the groups of the content reproduction start time;
   perform control such that the content is delivered in order from a group having an earlier content reproduction start time to a group having a later content reproduction start time;
   acquire transmittability of the delivery apparatus;
   acquire transmittability of the communication apparatuses; and
   acquire bit rates of the content,
   wherein the processor determines total transmittability of the communication apparatuses of each of the groups and a total of the bit rates, and perform grouping such that either higher one of the total transmittability and the total bit rate does not exceed transmittability of the communication apparatuses of a group in a higher hierarchical level,
   wherein each of the communication apparatuses is configured to:
   receive the content;
   store the received content; and
   reproduce the stored content according to the reproduction start time notified from the communication control apparatus.

2. A communication control apparatus, comprising:
   a processor and a memory coupled to the processor and storing instructions that, when executed by the processor, cause the processor to:
   communicate with a plurality of communication apparatuses and a content delivery apparatus;
   group the plurality of communication apparatuses into groups and construct a hierarchical delivery topology;
   determine a content reproduction start time to start reproducing content for each of the groups;
   notify the communication apparatuses in each of the groups of the content reproduction start time;
   perform control such that the content is delivered in order from a group having an earlier content reproduction start time to a group having a later content reproduction start time;
   acquire transmittability of the delivery apparatus;
   acquire transmittability of the communication apparatuses; and
   acquire bit rates of the content,
   wherein the processor determines total transmittability of the communication apparatuses of each of the groups and a total of the bit rates, and perform grouping such that either higher one of the total transmittability and the total bit rate does not exceed transmittability of the communication apparatuses of a group in a higher hierarchical level.

3. The apparatus according to claim 2, wherein
   the processor notifies the communication apparatuses of a group that transmits content of receiver device information regarding the communication apparatuses of a group that receives the content; and
   the processor notifies the communication apparatuses of the group that receives the content of delivery device information regarding the communication apparatuses of the group that transmits the content.

4. The apparatus according to claim 2, wherein
   the processor constructs a delivery topology in which content delivered from the delivery apparatus is sequentially delivered from the communication apparatuses of a group that belongs to a higher hierarchical level to the communication apparatuses of a group that belongs to a lower hierarchical level; and
   the processor reconstructs the delivery topology when one of the communication apparatuses disassociates from the delivery topology.

5. The apparatus according to claim 4, wherein
   the processor receives a disassociation notification from the communication apparatus that disassociates from the delivery topology,
   wherein when the disassociation notification is received, the processor notifies the communication apparatuses of a group in a lower hierarchical level that were receiving content from the communication apparatus disassociated from the delivery topology of delivery device information indicating that a communication apparatus of a group in a higher hierarchical level that was transmitting content to the disassociated communication apparatus is to be a substitute delivery device.

6. The apparatus according to claim 4, wherein
the processor acquires a time required to reconstruct the delivery topology,
wherein the processor determines a time longer than the time required for the re-construction as the reproduction start time.

7. A method of controlling a communication control apparatus having a communication unit and a grouping unit configured to group a plurality of communication apparatuses into groups and construct a hierarchical delivery topology, the method comprising:
determining a content reproduction start time to start reproducing content for each of the groups;
notifying the communication apparatuses in each of the groups of the content reproduction start time;
performing control such that the content is delivered in order from a group having an earlier content reproduction start time to a group having a later content reproduction start time;
acquiring transmittability of the delivery apparatus;
acquiring transmittability of the communication apparatuses; and
acquiring bit rates of the content;
wherein the grouping unit is configured to determine total transmittability of the communication apparatuses of each of the groups and a total of the bit rates, and perform grouping such that either higher one of the total transmittability and the total bit rate does not exceed transmittability of the communication apparatuses of a group in a higher hierarchical level.

8. A non-transitory computer-readable storage medium storing a program for causing a processor to execute a method of controlling a communication control apparatus having a communication unit and a grouping unit configured to group a plurality of communication apparatuses into groups and construct a hierarchical delivery topology, the method comprising:
determining a content reproduction start time to start reproducing content for each of the groups;
notifying the communication apparatuses in each of the groups of the content reproduction start time;
performing control such that the content is delivered in order from a group having an earlier content reproduction start time to a group having a later content reproduction start time;
acquiring transmittability of the delivery apparatus;
acquiring transmittability of the communication apparatuses; and
acquiring bit rates of the content,
wherein the grouping unit is configured to determine total transmittability of the communication apparatuses of each of the groups and a total of the bit rates, and perform grouping such that either higher one of the total transmittability and the total bit rate does not exceed transmittability of the communication apparatuses of a group in a higher hierarchical level.

* * * * *